United States Patent

Müller et al.

[11] Patent Number: 5,871,675
[45] Date of Patent: Feb. 16, 1999

[54] CROSSLINKED TINTED POLYMERS

[75] Inventors: Achim Müller, Aschaffenburg; Thomas Pöhlmann, Niedernberg; Bernhard Seiferling, Goldbach, all of Germany

[73] Assignee: Novartis AG., Basel, Switzerland

[21] Appl. No.: 875,532

[22] PCT Filed: Jan. 23, 1996

[86] PCT No.: PCT/EP96/00252

§ 371 Date: Sep. 18, 1997

§ 102(e) Date: Sep. 18, 1997

[87] PCT Pub. No.: WO96/24076

PCT Pub. Date: Aug. 8, 1996

[30] Foreign Application Priority Data

Feb. 3, 1995 [CH] Switzerland ................ 316/95

[51] Int. Cl.[6] ............. G02B 1/12; C08G 63/91; C08F 224/00; C07C 43/00
[52] U.S. Cl. ............ 264/1.38; 264/496; 525/61; 526/266; 568/587; 568/588; 568/589; 523/108
[58] Field of Search ............... 525/61; 526/266; 568/587, 588, 589; 264/1.38, 496; 523/108

[56] References Cited

U.S. PATENT DOCUMENTS

| 4,347,198 | 8/1982 | Ohkada et al. | 264/2.3 |
| 4,553,975 | 11/1985 | Su | 8/507 |
| 5,583,163 | 12/1996 | Müller | 525/61 |

FOREIGN PATENT DOCUMENTS

| 0072353A2 | 8/1982 | European Pat. Off. |
| 0388357A1 | 3/1990 | European Pat. Off. |

Primary Examiner—Jeffrey Smith
Assistant Examiner—Wu C. Cheng
Attorney, Agent, or Firm—Michael U. Lee; R. Scott Meece

[57] ABSTRACT

The invention relates to a novel process for the production of tinted mouldings, in particular tinted contact lenses, in which a crosslinkable tinted polymer comprising units containing a crosslinkable group and units containing a reactive dye radical is crosslinked in solution, and to tinted mouldings, in particular tinted contact lenses, obtainable by this process. The present invention likewise relates to novel crosslinkable tinted polymers comprising units containing a crosslinkable group and units containing a reactive dye radical which can be employed in the novel process, in particular derivatives of a polyvinyl alcohol having a molecular weight of at least about 2000, to crosslinked tinted polymers, either homopolymers or copolymers, made from these novel crosslinkable tinted polymers containing a reactive dye radical, a process for the preparation of the novel crosslinkable tinted polymers comprising units containing a crosslinkable group and units containing a reactive dye radical and the homopolymers and copolymers obtainable therefrom, to tinted mouldings made from said homopolymers or copolymers, in particular tinted contact lenses made from these homopolymers or copolymers, and to a process for the production of tinted contact lenses using said homopolymers or copolymers.

49 Claims, No Drawings

CROSSLINKED TINTED POLYMERS

The invention relates to a novel process for the production of mouldings, in particular contact lenses, in which a crosslinkable tinted polymer is crosslinked in solution, and to mouldings, in particular contact lenses, which are obtainable by this process.

The present invention also relates to novel crosslinkable tinted polymers comprising units containing a crosslinkable group and units containing a covalently bonded reactive dye radical which can be employed in the novel process, in particular those based on starting polymers containing functional groups, for example hydroxyl groups, on the polymer chain or functional groups, for example imino groups, in the polymer chain or functional groups bonded to the polymer skeleton via a bridge, where these functional groups allow covalent bonds to compounds containing a crosslinkable modifier group or another modifier group. These starting polymers are, in particular, polyhydroxyl compounds having a 1,2-and/or 1,3-diol structure, such as polyvinyl alcohol, or hydrolysed copolymers of vinyl acetate, for example copolymers with vinyl chloride, N-vinylpyrrolidone, etc. The invention furthermore relates to crosslinked novel polymers, either homopolymers or copolymers, made from these novel crosslinkable tinted polymers, to a process for the preparation of the novel crosslinkable tinted polymers and the homopolymers and copolymers obtainable therefrom, to mouldings made from said homopolymers or copolymers, in particular contact lenses made from these homopolymers or copolymers, and to a process for the production of contact lenses using the said homopolymers or copolymers.

Tinted or coloured contact lenses are known. Conventional contact lenses are only tinted or coloured after their final shaping by subsequent application of a reactive dye tinting taking place on the surface (for example in accordance with EP-A-0 388 357 and EP-A-0 072 353). This tinting process is followed by at least a neutralization step, an extraction step and a rinsing step, ie the completion of the lenses takes a considerable time.

One of the objects of the present invention was substantially to reduce or completely to eliminate these time-consuming production steps.

This object is achieved in accordance with the invention on the one hand by the provision of novel crosslinkable tinted polymers comprising units containing a crosslinkable group and units containing a covalently bonded reactive dye radical, and on the other hand by crosslinking these crosslinkable tinted polymers directly, preferably in water, in particular by photocrosslinking, very rapidly to give crosslinked tinted polymers, in particular tinted contact lenses.

The invention thus consists in, in particular, carrying out the tinting of contact lenses before their final shaping. This overcomes all disadvantages known from the prior art mentioned, and in particular the time-consuming neutralization steps and extraction steps for completion of the lenses are eliminated.

The present invention relates, in particular, to starting polymers (homopolymers and copolymers) which contain a functional group on the polymer chain, for example a hydroxyl (aliphatic or phenolic), amino, amido, thio or carboxyl group, or functional derivatives thereof, or which contain a functional group in the polymer chain, for example an imino group, which can then react directly with a reactive dye molecule or can react with a group which contains a crosslinkable group or a group containing a reactive dye.

Besides the reactive dye molecule and the crosslinkable group, the polymer backbone can, if desired, also contain further modifiers.

The starting polymers are preferably derivatives of polyvinyl alcohol or copolymers of vinyl alcohol which contain a 1,3-diol skeleton. The crosslinkable group and the group containing a reactive dye radical can be bonded to the polymer skeleton in various ways, for example, in the case of a group containing a crosslinkable group, through a certain percentage of the 1,3-diol units being modified to give a 1,3-dioxane which contains a crosslinkable radical in the 2-position. The crosslinkable radical is, in particular, an aminoalkyl radical with a crosslinkable group bonded to its nitrogen atom. This is preferably a derivative of a polyvinyl alcohol having a mean molecular weight of at least about 2000 which comprises from about 0.5 to about 80%, based on the number of hydroxyl groups in the polyvinyl alcohol, of units of the formula I

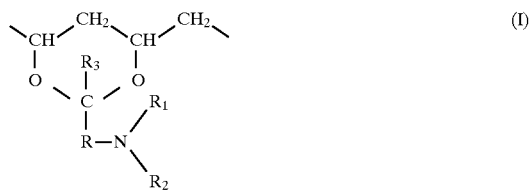

in which R is alkylene having up to 12 carbon atoms, $R_1$ is hydrogen or lower alkyl, and $R_2$ is an olefinically unsaturated, electron-withdrawing, copolymerizable radical, preferably having up to 25 carbon atoms, and $R_3$ is hydrogen, a $C_1C_6$alkyl group or a cycloalkyl group. $R_2$ is, for example, an olefinically unsaturated acyl radical of the formula $R_{30}$—CO—, in which $R_{30}$ is an olefinically unsaturated, copolymerizable radical having 2 to 24 carbon atoms, preferably having 2 to 8 carbon atoms, particularly preferably having 2 to 4 carbon atoms. In another embodiment, the radical $R_2$ is a radical of the formula II

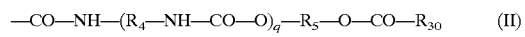

in which q is zero or one, and $R_4$ and $R_5$, independently of one another, are lower alkylene having 2 to 8 carbon atoms, arylene having 6 to 12 carbon atoms, a saturated bivalent cycloaliphatic group having 6 to 10 carbon atoms, arylenealkylene or alkylenearylene having 7 to 14 carbon atoms or arylenealkylenearylene having 13 to 16 carbon atoms, and in which $R_{30}$ is as defined above.

The crosslinkable polymer is therefore in particular a derivative of a polyvinyl alcohol having a molecular weight of at least about 2000 which comprises units of the formula III

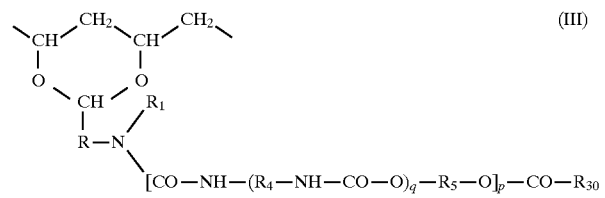

in which R is lower alkylene, $R_1$ is hydrogen or lower alkyl, p has the value zero or one, q has the value zero or one, $R_{30}$ is an olefinically unsaturated, copolymerizable radical having 2 to 8 carbon atoms, and $R_4$ and $R_5$, independently of one another, are lower alkylene having 2 to 8 carbon atoms, arylene having 6 to 12 carbon atoms, a saturated bivalent cycloaliphatic group having 6 to 10 carbon atoms, arylenealkylene or alkylenearylene having 7 to 14 carbon atoms or arylenealkylenearylene having 13 to 16 carbon atoms.

Alkylene R preferably has up to 12 carbon atoms and can be linear or branched. Suitable examples include octylene, hexylene, pentylene, butylene, propylene, ethylene, methylene, 2-propylene, 2-butylene and 3-pentylene. Lower alkylene R preferably has up to 6, particularly preferably up to 4 carbon atoms. Methylene and butylene are particularly preferred.

$R_1$ is preferably hydrogen or lower alkyl having up to seven, in particular up to four, carbon atoms, in particular hydrogen.

Lower alkylene $R_4$ or $R_5$ preferably has 2 to 6 carbon atoms and is, in particular, linear. Suitable examples include propylene, butylene, hexylene, dimethylethylene and, particularly preferably, ethylene.

Arylene $R_4$ or $R_5$ is preferably phenylene, which is unsubstituted or substituted by lower alkyl or lower alkoxy, in particular 1,3-phenylene or 1,4-phenylene or methyl-1,4-phenylene.

A saturated bivalent cycloaliphatic group $R_4$ or $R_5$ is preferably cyclohexylene or cyclohexylene(lower alkylene), for example cyclohexylenemethylene, which is unsubstituted or substituted by one or more methyl groups, for example trimethylcyclohexylenemethylene, for example the bivalent isophorone radical.

The arylene unit of alkylenearylene or arylenealkylene $R_4$ or $R_5$ is preferably phenylene, unsubstituted or substituted by lower alkyl or lower alkoxy, and the alkylene unit thereof is preferably lower alkylene, such as methylene or ethylene, in particular methylene. Radicals $R_4$ or $R_5$ of this type are therefore preferably phenylenemethylene or methylenephenylene.

Arylenealkylenearylene $R_4$ or $R_5$ is preferably phenylene(lower alkylene)phenylene having up to 4 carbon atoms in the alkylene unit, for example phenyleneethylenephenylene.

The radicals $R_4$ and $R_5$ are preferably, independently of one another, lower alkylene having 2 to 6 carbon atoms, phenylene, unsubstituted or substituted by lower alkyl, cyclohexylene or cyclohexylene(lower alkylene), unsubstituted or substituted by lower alkyl, phenylene(lower alkylene), (lower alkylene)phenylene or phenylene(lower alkylene)phenylene.

For the purposes of this invention, the term "lower" in connection with radicals and compounds denotes, unless defined otherwise, radicals or compounds having up to 7 carbon atoms, preferably having up to 4 carbon atoms.

Lower alkyl has, in particular, up to 7 carbon atoms, preferably up to 4 carbon atoms, and is, for example, methyl, ethyl, propyl, butyl or tert-butyl.

Lower alkoxy has, in particular, up to 7 carbon atoms, preferably up to 4 carbon atoms, and is, for example, methoxy, ethoxy, propoxy, butoxy or tert-butoxy.

The olefinically unsaturated, copolymerizable radical $R_{30}$ having 2 to 24 carbon atoms is preferably alkenyl having 2 to 24 carbon atoms, in particular alkenyl having 2 to 8 carbon atoms, particularly preferably alkenyl having 2 to 4 carbon atoms, for example ethenyl, 2-propenyl, 3-propenyl, 2-butenyl, hexenyl, octenyl or dodecenyl. Ethenyl and 2-propenyl are preferred, so that the —CO—$R_{30}$ group is the acyl radical of acrylic acid or methacrylic acid.

The bivalent group —$R_4$—NH—CO—O— is present if q is one and absent if q is zero. Crosslinkable polymers in which q is zero are preferred.

The bivalent group —CO—NH—($R_4$—NH—CO—O)$_q$—$R_5$—O— is present if p is one and absent if p is zero. Crosslinkable polymers in which p is zero are preferred.

In the crosslinkable polymers in which p is one, the index q is preferably zero. Particular preference is given to crosslinkable polymers in which p is one, the index q is zero and $R_5$ is lower alkylene.

A preferred novel polymer is therefore in particular a derivative of a polyvinyl alcohol having a molecular weight of at least about 2000 which comprises units; of the formula III in which R is lower alkylene having up to 6 carbon atoms, p is zero and $R_{30}$ is alkenyl having 2 to 8 carbon atoms.

A further preferred crosslinkable polymer is therefore in particular a derivative of a polyvinyl alcohol having a molecular weight of at least about 2000 which comprises units of the formula III in which R is lower alkylene having up to 6 carbon atoms, p is one, q is zero, $R_5$ is lower alkylene having 2 to 6 carbon atoms, and $R_{30}$ is alkenyl having 2 to 8 carbon atoms.

A further preferred crosslinkable polymer is therefore in particular a derivative of a polyvinyl alcohol having a molecular weight of at least about 2000 which comprises units of the formula III in which R is lower alkylene having up to 6 carbon atoms, p is one, q is one, $R_4$ is lower alkylene having 2 to 6 carbon atoms, phenylene, unsubstituted or substituted by lower alkyl, cyclohexylene or cyclohexylene (lower alkylene), unsubstituted or substituted by lower alkyl, phenylene(lower alkylene), (lower alkylene)phenylene or phenylene(lower alkylene)phenylene, $R_5$ is lower alkylene having 2 to 6 carbon atoms, and $R_{30}$ is alkenyl having 2 to 8 carbon atoms.

One way of fixing the reactive dye other than directly to the polymer backbone comprises reacting the reactive dye with, for example, an amino group of a compound which then serves as a bridge to the polymer chain. Suitable such bridges are all bivalent and trivalent groups which on the one hand form a covalent bond to the polymer backbone and on the other hand contain the covalently bonded reactive dye radical. From the large number of such bridges, mention may be made by way of example of acetal and ketal bridges.

The units containing a reactive dye radical covalently bonded to the polymer backbone conform, in particular, to the formulae IV, IVA, IVB and IVC below

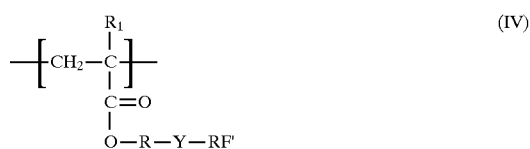
(IV)

(IVA)

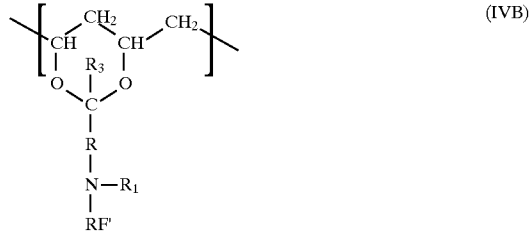
(IVB)

(IVC)

in which:

RF' is the radical of the formula

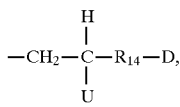

D is a radical of an organic dye, $R_{14}$ is a divalent electron-withdrawing group, U is hydrogen or halogen, R is a divalent radical of a $C_1$–$C_{12}$alkane, $R_1$ is hydrogen or $C_1$–$C_4$alkyl, $R_3$ is hydrogen, $C_1$–$C_6$alkyl or cycloalkyl, and Y is —O— or —N($R_1$)—.

Polyvinyl alcohols which can be derivatized preferably have a mean molecular weight of at least 2000, in particular about 10,000. The upper limit to their molecular weight is up to 1,000,000. The polyvinyl alcohols preferably have a molecular weight of up to 300,000, in particular of up to 100,000, very particularly preferably of up to about 50,000.

Suitable polyvinyl alcohols usually have principally a 1,3-diol structure. However, the derivatized crosslinkable polyvinyl alcohols can also contain hydroxyl groups in the form of 1,2-glycols, such as copolymer units of 1,2-dihydroxyethylene, as can be obtained, for example, by alkaline hydrolysis of vinyl acetate-vinylene carbonate copolymers.

In addition, the derivatized polyvinyl alcohols can also contain small proportions, for example of up to 20%, preferably of up to 5%, of copolymer units of ethylene, propylene, acrylamide, methacrylamide, dimethacrylamide, hydroxyethyl methacrylate, methyl methacrylate, methyl acrylate, ethyl acrylate, vinylpyrrolidone, hydroxyethyl acrylate, allyl alcohol, styrene or similar comonomers usually used.

Polyvinyl alcohols (PVA) which can be used as starting polymers are commercially available polyvinyl alcohols, for example Vinol® 107 from Air Products (MW=22,000 to 31,000, 98–98.8% hydrolysed), Polysciences 4397 (MW= 25,000, 98.5% hydrolysed), BF 14 from Chan Chun, Elvanol® 90–50 from DuPont and UF-120 from Unitika. Other producers are, for example, Nippon Gohsei (Gohsenol®), Monsanto (Gelvatol®), Wacker (Polyviol®) or the Japanese producers Kuraray, Denki and Shin-Etsu. However, it is advantageous to use Mowiol® products from Hoechst, in particular those of the 3–83, 4–88, 4–98, 6–88, 6–98, 8–88, 8–98, 10–98, 20–98, 26–88 and 40–88 type.

The PVAs are prepared by basic or acidic, partial or virtually complete hydrolysis of polyvinyl acetate.

As mentioned above, it is also possible to use copolymers of hydrolysed or partially hydrolysed vinyl acetate, which are obtainable, for example, as hydrolysed ethylene-vinyl acetate (EVA), or vinyl chloride-vinyl acetate, N-vinylpyrrolidone-vinyl acetate and maleic anhydride-vinyl acetate.

Polyvinyl alcohol is usually prepared by hydrolysis of the corresponding homopolymeric polyvinyl acetate. In a preferred embodiment, the polyvinyl alcohol derivatized in accordance with the invention comprises less than 50% of polyvinyl acetate units, in particular less than 20% of polyvinyl acetate units. Preferred amounts of residual acetate units in the polyvinyl alcohol derivatized in accordance with the invention are, based on the total amount of vinyl alcohol units and acetate units, from about 2 to 20%, preferably from about 2 to 16%, in particular from 2 to 12%, especially from 0.5 to 3%.

Polyvinyl alcohols comprising units of the formula III can be prepared in a manner known per se. For example, a polyvinyl alcohol having a mean molecular weight of at least about 2000 which comprises units of the formula VI

can be reacted with from about 0.5 to 80%, based on the number of hydroxyl groups in the compound of the formula VI, of a compound of the formula (VII)

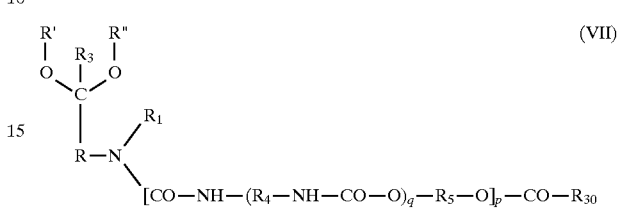

in which R' and R", independently of one another, are hydrogen, lower alkyl or lower alkanoyl, such as acetyl or propionyl, and the other variables are as defined under the formula III, in particular in an acidic medium.

Alternatively, a polyvinyl alcohol having a molecular weight of at least about 2000 and which comprises units of the formula VI can be reacted with a compound of the formula VIII

in which the variables are as defined for the compound of the formula VII, in particular under acidic conditions, and the resultant cyclic acetal can subsequently be reacted with a compound of the formula IX

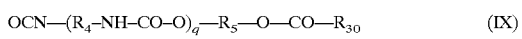

in which the variables are as defined for the compound of the formula VII.

Alternatively, the product obtainable as described above from a compound of the formula VI and a compound of the formula VIII can be reacted with a compound of the formula (X)

in which $R_{30}$ is, for example, alkenyl having 2 to 8 carbon atoms, and X is a reactive group, for example etherified or esterified hydroxyl, for example halogen, in particular chlorine.

Compounds of the formula VII in which p is zero are disclosed, for example, in EP 201 693. Compounds of the formula VIII are also described therein. Compounds of the formula IX are known per se or can be prepared in a manner known per se. An example of a compound of the formula IX in which q is zero is isocyanatoethyl methacrylate. An example of a compound of the formula IX in which q is one is a product of the reaction of isophorone diisocyanate with 0.5 equivalent of hydroxyethyl methacrylate. Compounds of the formula X are known per se, a typical representative being methacryloyl chloride. Compounds of the formula VII in which p and/or q is 1 can be prepared in a manner known per se from the abovementioned compounds, for example by reacting a compound of the formula VIII with isocyanatoethyl methacrylate or by reacting a compound of the formula VIII with isophorone diisocyanate which has previously been terminated with 0.5 equivalent of hydroxyethyl methacrylate.

Polyvinyl alcohols comprising units of the formula IVB can be prepared in a manner known per se. For example, a polyvinyl alcohol having a mean molecular weight of at least about 2000 which comprises units of the formula VI $$-CH(OH)-CH_2- \qquad \text{VI}$$

can be reacted with a compound of the formula XI $$\begin{array}{c} R' \quad R'' \\ | \quad R_3 \quad | \\ O \diagdown | \diagup O \\ C \\ | \\ R \\ | \\ N-R_1 \\ | \\ RF' \end{array} \qquad (XI)$$

in which the symbols R' and R" are hydrogen, lower alkyl or lower alkanoyl, and the other symbols $R_3$, R, $R_1$, and RF' are as defined above, in aqueous/alkaline medium, for example in a sodium carbonate solution, at from room temperature to about 40° C.

The compounds of the formula XI are novel and represent a further subject-matter of the invention.

These compounds of the formula XI are obtained, for example, by reacting an ωaminoaldehyde acetal, such as ω-aminoacetaldehyde dimethyl acetal or 4-aminobutyraldehyde diethyl acetal, with a compound which introduces the reactive dye radical RF', for example one of the formula $$D-R_{14}-CH(U)-CH_2-O-SO_3Na$$

in which D, U and $R_{14}$ are as defined under the formulae IV to IVC. Reactive dyes which can be used are in particular those which are known as "reactive dyes which form ether bonds". These dyes contain reactive groups which react with cellulose to form an ether bond. They are described in general terms in Fiber-Reactive Dyes, Chapter VI, by W. F. Beech, SAF International, Inc., New York (1970). U.S. Pat. No. 4,553,775 (Su) likewise mentions typical examples of commercially available dyes which can be used.

Of the reactive dye types which are suitable for the novel use, mention may be made, for example, of the following general classes: reactive dyes containing vinyl sulfone precursors, such as β-sulfatoethylsulfonyl, β-sulfatoethylsulfonamido, β-hydroxyethylsulfonyl and β-hydroxyethylsulfonamido substituents, and suitable derivatives thereof; dyes containing acryloylamino, β-chloropropionylamino and β-sulfatopropionylamino groups and related reactive groups; dyes containing β-phenylsulfonylpropionylamino groups; dyes containing β-sulfato or β-chloroethylsulfamoyl groups; chloroacetyl dyes; α-bromoacryloyl dyes; and many other reactive dyes developed for use in the dyeing of natural and synthetic fibres, in particular cellulose or wool, which act by nucleophilic addition reactions.

Some typical examples of commercially available dyes which are suitable for the novel use are dye—$SO_2$—$CH_2CH_2$—O—$SO_3Na$ (Remazol), dye—$SO_2NHCH_2CH_2OSO_3Na$ (Levafix), dye—NH-OC-$CH_2CH_2SO_2C_6H_5$(Solidazol), $$\text{dye-NH}-OC-\underset{\underset{Br}{|}}{CH}-CH_2Br \text{ (Lanasol)},$$

$$\text{dye-NH}-OC-\underset{\underset{Br}{|}}{C}=CH_2$$

The invention also covers the use of dyes containing more than one reactive group (albeit in very small amounts) which is suitable for the formation of a covalent bond by nucleophilic addition reaction with hydroxyl, amino or mercapto groups.

Reactive dyes which are particularly suitable for formation of a covalent bond with the hydroxyl, amino, amido or mercapto groups present in the simple or derivatized crosslinkable polymer are those of the general formulae XVII or XVIII $$D-R_{14}-\underset{\underset{U}{|}}{C}=CH_2 \qquad \text{XVII}$$

$$D-R_{14}-\underset{\underset{U}{|}}{CH}-\underset{\underset{V}{|}}{CH_2} \qquad \text{XVIII}$$

in which D is the radical of an organic dye;

$R_{14}$ is a divalent, organic, electron-withdrawing group which is suitable for withdrawing electrons from the carbon atoms in the $$\diagdown_{\diagup}C=CH_2 \quad \text{or} \quad \diagdown_{\diagup}CH-CH_2$$

groups in the formulae

XVII and XVIII and thus activating them;

U is hydrogen or halogen, and

V is a leaving group, or mixtures thereof.

The organic dye radical D is preferably the radical of an azo (monoazo or disazo), phthalocyanine, azomethine, nitro, metal complex or anthraquinone dye.

The reactive dyes of the formula XVIII eliminate HV in the reaction media, forming intermediates of the formula XVII, which subsequently react by nucleophilic addition.

The divalent group —$R_{14}$— can be bonded directly to an aromatic ring carbon of D or can be bonded thereto via an aliphatic group, such as an alkylene group, for example a lower alkylene group.

Suitable divalent groups $R_{14}$ include, for example, —CO—, —$SO_2$—, —SO—, —NHCO—, —NHSO_2—, —$SO_2NH$— and the like. $R_{14}$ is most preferably —$SO_2$—, —$SO_2NH$—, —CO— or —NHCO—, especially —$SO_2$—.

If U is halogen, it is most preferably chlorine or bromine.

Suitable leaving groups V include —Cl, —Br, —OH, di(lower alkyl)amino, $$-OCH_2\overset{+}{N}\diagup\!\!\!\diagdown Cl^-$$

—$SO_2$—phenyl, —$OSO_3^-$—$Z^+$, in which $Z^+$ is a cation, —$OSO_3R_{15}$ or —$OSO_2R_{15}$, in which $R_{15}$ is in each case alkyl, aryl, aralkyl or alkaryl.

If $R_{15}$ is alkyl, it is advantageously alkyl having 1 to 6 carbon atoms, and preferably alkyl having 1 to 4 carbon atoms. If $R_{15}$ is aryl, it is preferably phenyl or naphthyl. If $R_{15}$ is alkaryl, it is preferably (lower alkyl)-substituted phenyl, such as tolyl or xylyl, and if $R_{15}$ is aralkyl, it is preferably phenyl(lower alkyl), such as benzyl or phenethyl.

The present invention also covers the use of halotriazine dyes, in particular chlorotriazine dyes, obtainable from Ciba-Geigy AG. These typically have the formula

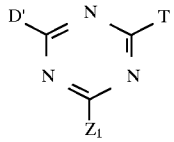

in which D' is a radical of an organic dye of the abovementioned type, which is bonded to the triazine ring either directly or via a suitable linker, T is a solubilizing moiety, halogen or a further D', and $Z_1$ is halogen, preferably fluorine, chlorine or bromine, in particular fluorine or chlorine, most preferably chlorine. If two halogen groups are present, these can be identical to or different from one another. If two groups D' are present, these can be identical to or different from one another. Corresponding dyes or radicals are known to the person skilled in the art, for example from EP-A-388 356.

Mention may be made by way of example of an anthraquinone dye (dichlorotriazinyl derivative), such as Reactive Blue 4, and an azo dye (dichlorotriazinyl derivative), such as Reactive Red 11.

Particularly preferred reactive dyes which can be used for tinting crosslinkable polymers have the trade names Remazol Schwarz B (Reactive Black 5), Remazol Brillantblau R (Reactive Blue 19, Duasyn-Blau R-R), Remazol Türkisblau G (Reactive Blue 21, Duasyn-Blau R-KG), Remazol Goldorange 3G (Reactive Orange 78), Remazol Brillantrot F3B (Reactive Red 180, Duasyn-Rot R-F3B), Remazol Gelb GR (Reactive Yellow 15), Remazol Brillantgelb GL (Reactive Yellow 37, Duasyn-Gelb R-GL), Duasyn-Gelb R-R (mixture of Reactive Yellow 17 and Reactive Yellow 15), Remazol Brillantgriin 6B (Reactive Blue 38, Duasyn-Grun R-K6B), Remazol Schwarz RL (Reactive Black 31, Duasyn-Schwarz R-KRL), Duasyn-Schwarz R-N (mixture of Reactive Black 5 and Reactive Orange 72), Remazol Brillantorange 3R (Reactive Orange 16), Remazol Brillantblau B, Remazol Brillantblau BB, Remazol Druckschwarz G, Remazol Rot B, and Duasyn-Blau R-UG.

For further illustration, the following shows the bonding of a reactive dye to a polymer backbone, either directly or via a bridge, where, in these formulae, D is a reactive dye radical, for example the radical of Remazol Brillantblau R of the following formula:

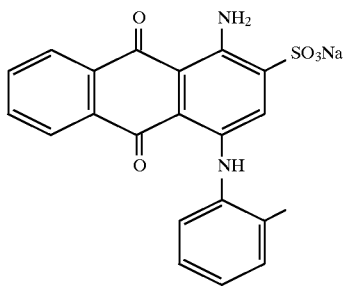

The following formulae, which serve for further illustration, conform to the formulae IVC, IVA, IVB and IV (in this sequence):

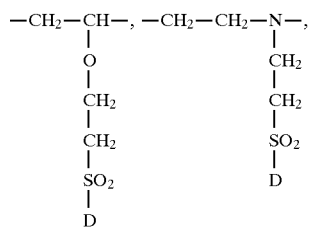

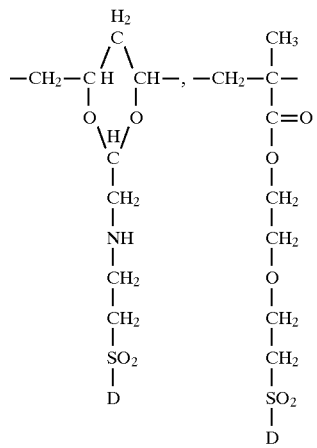

The concentration of the reactive dyes in the crosslinkable polymer can be up to 5% and is in particular in the range from 0.001 to 3%, in particular from 0.01 to 2%.

The tinting process is generally followed by a neutralization process, for example with 0.01N HCl solution, after which the crosslinkable tinted polymer is purified.

The following are further starting polymers comprising, for example, copolymer units in the polymer chain which are derived from the following monomer units : a vinyllactam (a), vinyl alcohol (b), if desired a vinyl (lower alkane) carboxylate (c), a vinylic crosslinking agent (d) and, if desired, a vinylic photoinitiator (e).

Preferred starting polymers comprise units derived from the following monomer units in the copolymer chain:
  5–85 percent by weight of a vinyllactam (a),
  3–80 percent by weight of vinyl alcohol (b),
  0–65 percent by weight of a vinyl (lower alkane) carboxylate (c),
  3–40 percent by weight of a vinylic crosslinking agent (d) and
  0–5 percent by weight of a vinylic photoinitiator (e).

Preference is furthermore given to a starting polymer comprising units derived from the following monomer units in the copolymer chain:
  10–75 percent by weight of a vinyllactam (a),
  10–65 percent by weight of vinyl alcohol (b),
  2–40 percent by weight of a vinyl (lower alkane) carboxylate (c),
  5–35 percent by weight of a vinylic crosslinking agent (d) and
  0–3 percent by weight of a vinylic photoinitiator (e).

Of particular interest are starting polymers comprising units derived from the following monomer units in the copolymer chain:
  20–70 percent by weight of a vinyllactam (a),
  15–60 percent by weight of vinyl alcohol (b),
  5–30 percent by weight of a vinyl (lower alkane) carboxylate (c), 7–30 percent by weight of a vinylic crosslinking agent (d) and 0–2 percent by weight of a vinylic photoinitiator (e).

The term vinyllactam (a) here is taken to mean, for example, a five- to seven-membered lactam of the formula (XII)

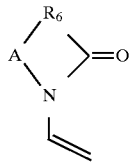
(XII)

where $R_6$ is linear or branched (if desired multiply branched) alkylene or alkenylene having 2 to 8 carbon atoms, and A is CO or $CR_7R_8$, where $R_7$ is hydrogen, lower alkyl, aryl, aralkyl or alkaryl, and $R_8$ is hydrogen or lower alkyl.

Some N-vinyllactams (a) conforming to the above structural formula (XII) are N-vinyl-2-pyrrolidone, N-vinyl-2-piperidone, N-vinyl-2-caprolactam, N-vinyl-:3-methyl-2-pyrrolidone, N-vinyl-3-methyl-2-piperidone, N-vinyl-3-methyl-2-caprolactam, N-vinyl-4-methyl-2-pyrrolidone, N-vinyl-4-methyl-2-caprolactam, N-vinyl-5-methyl-2-pyrrolidone, N-vinyl-5-methyl-2-piperidone, N-vinyl-5,5-dimethyl-2-pyrrolidone, N-vinyl-3,3,5-trimethyl-2-pyrrolidone, N-vinyl-5-methyl-5-ethyl-2-pyrrolidone, N-vinyl-3,4,5-trimethyl-3-ethyl-2-pyrrolidone, N-vinyl-6-methyl-2-piperidone, N-vinyl-6-ethyl-2-piperidone, N-vinyl- 3,5-dimethyl-2-piperidone, N-vi nyl-4,4-dimethyl-2-piperidone, N-vinyl-7-methyl-2-caprolactam, N-vinyl-7-ethyl-2-caprolactam, N-vinyl-3,5-dimethyl-2-caprolactam, N-vinyl4,6-dimethyl-2-caprolactam, N-vinyl-3,5,7-trimethyl-2-caprolactam, N-vinylmaleimide and N-vinylsuccinimide. If desired, mixtures thereof, can also be used.

A preferred vinyllactam (a) is a heterocyclic monomer of the formula XII containing 4 to 6 carbon atoms in the heterocyclic ring, in particular 4 carbon atoms in the heterocyclic ring, more preferably a heterocyclic monomer of the formula XII containing 4 carbon atoms in the heterocyclic ring in which $R_7$ is hydrogen or lower alkyl.

Another more preferred vinyllactam (a) is a heterocyclic monomer of the formula XII containing 4 carbon atoms in the heterocyclic ring in which $R_7$ and $R_8$, independently of one another, are hydrogen or lower alkyl. A highly preferred vinyllactam (a) is N-vinyl-2-pyrrolidone.

The term vinyl(lower alkane)carboxylate (c) is taken to mean, for example, vinyl heptanoate, vinyl hexanoate, vinyl pentanoate, vinyl butanoate, vinyl propanoate (vinyl propionate) or vinyl ethanoate (vinyl acetate). Mixtures of said vinyl esters (c) can likewise be used. Preferred vinyl (lower alkane)carboxylates (c) are vinyl acetate, vinyl propionate and mixtures of the two.

The term vinylic crosslinking agent (d) is taken to mean, for example, a derivative of the formula (XIII)

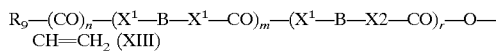

in which $R_9$ is a hydrocarbon group which can be polymerized by means of free radicals; n, m and r, independently of one another, are zero or one; the radicals B, independently of one another, are divalent radicals having up to 20 carbon atoms; radicals $X^1$, independently of one another, are —O—, —NH— or a single bond; and $X^2$ is NH or a single bond.

$R_9$ is, for example, alkenyl as a group, preferably having 2 to 12 carbon atoms, which can be polymerized by means of free radicals. Examples of alkenyl are vinyl, allyl, 1-propen-2-yl, 1-buten-2- or -3- or -4-yl, 2-buten-3-yl, the isomers of pentenyl, hexenyl, octenyl, decenyl and dodecenyl. $R_9$ preferably contains 2 to 12, particularly preferably 2 to 8, especially preferably 2 to 4, carbon atoms.

The divalent radical B is, for example, lower alkylene, arylene, a saturated bivalent cycloaliphatic group having 6 to 12 carbon atoms, alkylenearylene, arylenealkylene or arylenealkylenearylene.

A preferred vinylic crosslinking agent (d) is, for example, a compound of the formula (XIII) in which the polymerizable group $R_9$ is alkenyl having 2 to 8 carbon atoms; n, m and r, independently of one another, are zero or 1; the radicals B, independently of one another, are lower alkylene, arylene, a saturated bivalent cycloaliphatic group having 6 to 12 carbon atoms, alkylenearylene, arylenealkylene or arylenealkylenearylene; the radicals $X^1$, independently of one another, are —O—, —NH— or a single bond; and $X^2$ is NH or a single bond.

A preferred vinylic crosslinking agent (d) is, for example, a compound of the formula (XII) in which the polymerizable group $R_9$ is alkenyl having 2 to 8 carbon atoms; n, m and r, independently of one another, are zero or 1; the radicals B, independently of one another, are lower alkylene, arylene, a saturated bivalent cycloaliphatic group having 6 to 12 carbon atoms, alkylenearylene or arylenealkylene; the radicals $X^1$ independently of one another, are —O—, —NH— or a single bond; and $X^2$ is NH or a single bond. The radicals B are preferably, independently of one another, lower alkylene, arylene or a saturated bivalent cycloaliphatic group having 6 to 12 carbon atoms.

Another preferred vinylic crosslinking agent (d) is a compound of the formula (XIII) in which the polymerizable group $R_9$ is alkenyl having 2 to 8 carbon atoms; n=1 or 0, and n and r are zero.

A particularly preferred vinylic crosslinking agent (d) is, for example, a compound of the formula (XIII) in which the polymerizable group $R_9$ is alkenyl having 2 to 4 carbon atoms; m and n are one and r=1 or 0; the radicals B, independently of one another, are lower alkylene, arylene or a saturated bivalent cycloaliphatic group having 6 to 12 carbon atoms; the radicals $X^1$ independently of one another, are —O—, —NH— or a single bond; and $X^2$ is NH or a single bond.

A very preferred vinylic crosslinking agent (d) is, for example, a compound of the formula (XIII) in which the polymerizable group $R_9$ is alkenyl having 2 to 4 carbon atoms; m and n are one and p=1 or 0; the radicals B, independently of one another, are lower alkylene; the radicals $X^1$, independently of one another, are —O—, —NH— or a single bond; and $X^2$ is NH or a single bond.

Vinylpyrrolidone-vinyl alcohol copolymers can also be derivatized and thus crosslinked via an acetal structure.

The term vinylic photoinitiator (e) is taken to mean, for example, a derivative of the formula (XIV)

where the radicals $X^2$, independently of one another, are NH or a single bond; Y is —O—, —S— or —NH—; B is a divalent radical having up to 20 carbon atoms; and PI is a radical of a photoinitiator minus YH.

A preferred vinylic photoinitiator (e) is, for example, a compound of the formula (XIV) in which the radicals $X^2$, independently of one another, are NH or a single bond; Y is —O— or —NH—; B is a divalent radical and is, for example, lower alkylene, arylene, a saturated bivalent cycloaliphatic group having 6 to 12 carbon atoms, alkylenearylene, arylenealkylene or arylenealkylenearylene; and PI is the radical of a photoinitiator of the formula (XV) shown below minus YH. In this formula, Y is preferably —O—. Furthermore, independently of this preference for Y, B is preferably lower alkylene, arylene or a saturated bivalent cycloaliphatic group having 6 to 12 carbon atoms.

The term photoinitiator PI-YH is taken to mean, for example, a compound of the formula (XV)

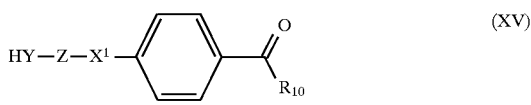

in which Y is —O—, —S— or —NH—; $X^1$ is —O—, —NH— or a single bond; Z is lower alkylene, arylene, a saturated bivalent cycloaliphatic group having 6 to 12 carbon atoms, alkylenearylene, arylenealkylene or arylenealkylenearylene; and $R_{10}$ is a radical of the formula (XVI)

in which $R_{11}$ is lower alkyl or lower alkoxy; $R_{12}$ is selected from lower alkyl, lower alkoxy and aralkyl; and $R_{13}$ is hydroxyl, di(lower alkyl)amino, aryl or azacyclooxaalkyl.

Preferred examples of radicals $R_{10}$ of the formula (XVI) are

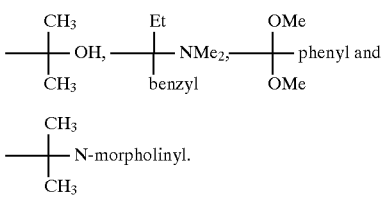

Highly preferred is furthermore a vinylic photoinitiator (e) in which the radicals $X_2$, independently of one another, are NH or a single bond; Y is —O—; B is a divalent radical, for example lower alkylene, arylene or a saturated bivalent cycloaliphatic group having 6 to 12 carbon atoms; and PI is the radical of, for example, 2-hydroxy-1-[4-(2-hydroxyethoxy)phenyl]2-methylpropan-1-one minus the primary hydroxyl group.

For the purposes of this invention, the term "lower" in connection with radicals and compounds denotes, unless defined otherwise, in particular radicals or compounds having up to 7 carbon atoms, preferably having up to 4 carbon atoms.

Lower alkyl can be linear or branched and has, in particular, up to 7 carbon atoms, preferably up to 4 carbon atoms, and is, for example, methyl, ethyl, propyl, isopropyl, n-butyl, isobutyl or tert-butyl.

Analogously, the term (lower alkane)carboxylic acid is taken to mean a linear or branched aliphatic carboxylic acid having up to 7 carbon atoms, preferably having up to 4 carbon atoms. Examples are acetic acid, propionic acid and butyric acid.

Alkylene has up to 10 carbon atoms and can be linear or branched. Suitable examples include decylene, octylene, hexylene, pentylene, butylene, propylene, ethylene, methylene, 2-propylene, 2-butylene and 3-pentylene. Alkylene is preferably lower alkylene.

Lower alkylene denotes alkylene having up to 7 carbon atoms, particularly preferably having up to 4 carbon atoms. Particularly preferred meanings of lower alkylene are methylene and ethylene.

Alkenylene has up to 10 carbon atoms and can be linear or branched. Suitable examples include decenylene, octenylene, hexenylene, butenylene and ethenylene. Alkenylene is preferably lower alkenylene.

Lower alkenylene denotes alkenylene having up to 7 carbon atoms, particularly preferably having up to 4 carbon atoms. A particularly preferred meaning of lower alkenylene is ethenylene.

Aryl is, for example, naphthyl, pyridyl, thienyl or preferably phenyl, unsubstituted or substituted by lower alkyl or lower alkoxy.

Lower alkoxy has, in particular, up to 7 carbon atoms, preferably up to 4 carbon atoms, and is, for example, methoxy, ethoxy, propoxy or tert-butoxy.

Aralkyl is preferably phenyl(lower alkyl) having up to 4 carbon atoms in the alkyl unit, for example 1- or 2-phenylethyl or benzyl.

Alkaryl is preferably (lower alkyl)phenyl having up to 4 carbon atoms in an alkyl unit, for example ethylphenyl, tolyl or xylyl.

Arylene is preferably phenylene, unsubstituted or substituted by lower alkyl or lower alkoxy, in particular 1,3-phenylene, 1,4-phenylene or methyl-1,4-phenylene.

A saturated bivalent cycloaliphatic group is preferably cyclohexylene or cyclohexylene(lower alkylene), for example cyclohexylenemethylene, unsubstituted or substituted by one or more lower alkyl groups, for example methyl groups, such as trimethylcyclohexylenemethylene, for example the bivalent isophorone radical.

Cycloalkyl has, in particular, up to 7 carbon atoms, preferably 3 to 6 carbon atoms, and is, for example, cyclopropyl, cyclobutyl, cyclopentyl or cyclohexyl.

The term azacyclooxaalkyl is taken to mean an oxygen-containing saturated azacycloalkyl radical in which the oxygen is incorporated into the ring and azacycloalkvl is a nitrogen-containing cycloalkyl radical. A typical example of an azacyclooxaalkane is morpholine.

These polymers are advantageously prepared, for example, already from a suitable starting polymer, for example from the product of the polymerization of an N-vinyllactam (a) and a vinyl (lower alkane)carboxylate (c). Examples of such starting polymers are N-vinylpyrrolidone-vinyl acetate, N-vinylpyrrolidone-vinyl propionate or mixed esters, namely N-vinylpyrrolidone-vinyl acetate/vinyl propionate.

The last-mentioned starting polymers are commercially available in various mean molecular weights and in various compositions.

Aldrich markets, for example, N-vinylpyrrolidone-vinyl acetate (VP-VAc) polymer as 60/40 copolymer (60% by weight of VP, 40% by weight of VAc) which is a powder and has a molecular weight of $M_n$=56 000. Aldrich also markets VP-VAc ³⁰⁄₇₀ in isopropanol.

A further supplier of VP-VAc starting polymers is BASF, which markets these polymers under the name Luviskol VA. Examples are Luviskol VA 28, Luviskol VA 37 and Luviskol VA 73 having a molecular weight of $M_n$=7000–22 000 (PMMA). Luviskol VA 37 HM is a high-molecular-weight starting polymer having an $M_n$ of 32 000 (PMMA).

The numerical coding of these Luviskols indicates the composition. For example, Luviskol VA 28 means that this is a VP-VAc starting polymer comprising about 20% by weight of VP and about 80% by weight of VAc.

The molecular weights ($M_n$) are determined by gel permeation chromatography (GPC) {size exclusion chromatography (SEC)} using DMF as solvent, and relate, unless otherwise stated, to polymethyl methacrylate (PMMA) calibration standard.

The N-vinyllactam (a)-vinyl (lower alkane)carboxylate (c) starting polymers can be partially or fully hydrolysed under acid or alkaline conditions. Partial hydrolysis gives terpolymers comprising the units vinyllactam (a), vinyl alcohol (b) and vinyl (lower alkane)carboxylate (c), for example a terpolymer of vinylpyrrolidone, vinyl acetate and vinyl alcohol. Complete hydrolysis gives a starting polymer comprising the units vinyllactam (a) and vinyl alcohol (b). Starting polymers hydrolysed in this way can be derivatized in a suitable manner, for example using methacryloyl chloride, a 1:1 addition product of toluene diisocyanate (TDI) and hydroxyethyl methacrylate (HEMA), a 1:1 addition product of isophorone diisocyanate (IPDI) and HEMA, or isocyanatoethyl methacrylate (IEM). Derivatization allows the type and amount, for example of the crosslinking agent component (d), to be determined and incorporated into the crosslinkable polymer.

An N-vinyllactam (a)-vinyl alcohol (b) starting polymer can be derivatized analogously, for example again using a suitable precursor of a vinylic photoinitiator (e). A precursor of this type is derived, for example, from the above formula (XIV), it being possible to formulate a precursor of this type by, for example, formal subtraction of vinyl alcohol in the formula (XIV). Derivatization of the starting polymer to give a crosslinkable polymer comprising a photoinitiator component (e) can take place simultaneously with or after the incorporation of a crosslinking agent component (d).

The molecular weight of a polymer is determined primarily through a suitable choice of the starting polymer, for example a commercial N-vinylpyrrolidone-vinyl acetate polymer. The derivatization described above only changes the molecular weight comparatively marginally and can in addition be controlled precisely through the choice, for example, of the crosslinking agent component and the degree of hydrolysis of the starting polymer. The molecular weights ($M_n$) of such polymers generally vary in the range of $M_n$=2000–200 000 g/mol. The molecular weight is preferably in the range from 5000 to 200 000 g/mol, and very preferably in the range from 10 000 to 100 000 g/mol.

The crosslinkable polymers can be prepared in the presence or absence of a solvent. Suitable solvents are in principle all solvents which dissolve both a starting polymer and a crosslinkable polymer to be prepared and in addition are substantially inert. Examples thereof are water, alcohols, such as lower alkanols, for example ethanol or methanol, furthermore carboxamides, such as dimethylformamide (DMF) or dimethylacetamide (DMA), ethers, for example diethyl ether, tetrahydrofuran (THF) or diethylene glycol dimethyl ether (diglyme), furthermore dimethyl sulfoxide, and mixtures of suitable solvents, for example mixtures of an alcohol with an ether, for example ethanol/THF, or methanol/diethyl ether. Preference is given to lower alkanols, carboxamides and dimethyl sulfoxide.

The preparation of crosslinkable polymers, in particular during and after incorporation of the crosslinking agent component (d) and especially of the photoinitiator component (e), should be carried out in the absence of light in order to prevent uncontrolled and premature crosslinking. It is also advantageous if atmospheric oxygen is not excluded during the synthesis of the crosslinkable polymers or is even admixed, since oxygen acts as a free-radical scavenger during the synthesis. Any free radicals present are scavenged, suppressing uncontrolled crosslinking. The oxygen thus acts as a stabilizer.

The composition of a crosslinkable polymer is the principal determinant, after it has been crosslinked, of the properties of a resultant moulding, for example a hydrogel contact lens. The crosslinking agent component (d) in a crosslinkable polymer can principally serve to control the mechanical properties of a contact lens. The water content of, for example, a hydrogel contact lens is determined, for example, by the vinyllactam (a) or vinyl alcohol (b) content in the crosslinkable polymer.

In addition to the abovementioned units, the novel water-soluble, crosslinkable polymers can also comprise further modifier units. Of the many possibilities for such modifiers, the following are mentioned by way of example:

Further units containing crosslinkable groups are, for example, those of the formulae A and B

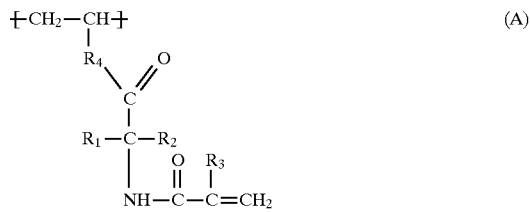

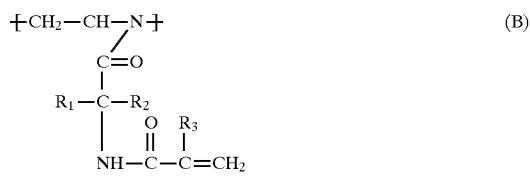

in which $R_1$ and $R_2$ embody amino acid radicals and are, independently of one another: hydrogen, a $C_1$–$C_8$alkyl group, an aryl group or a cyclohexyl group, these groups being unsubstituted or monosubstituted or polysubstituted, $R_3$ is hydrogen or a $C_1$–$C_4$alkyl group, and $R_4$ is an —O— or —NH— bridge.

Further units containing crosslinkable groups are, for example, those of the formula C

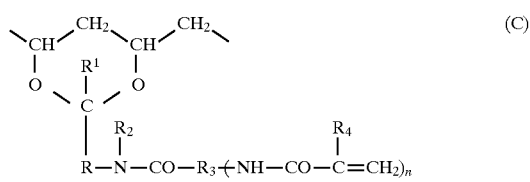

in which

R is a linear or branched bivalent radical of a $C_1$–$C_{12}$alkane, preferably of a $C_1$–$C_6$alkane, $R_1$ is hydrogen, a $C_1$–$C_6$alkyl group or a cycloalkyl group, preferably a cyclohexyl group, $R_2$ is hydrogen or a $C_1$–$C_6$alkyl radical, $R_3$ is the

group if n=0, or the

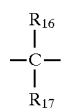

bridge if n =1, $R_4$ is hydrogen or $C_1$–$C_4$alkyl, n is zero or 1, preferably 0, and $R_{16}$ and $R_{17}$, independently of one another, are hydrogen, linear or branched $C_1$–$C_8$alkyl, aryl, preferably phenyl, or cyclohexyl;

or those of the formula D

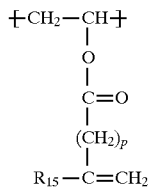 (D)

in which $R_{15}$ is hydrogen or a $C_1$–$C_4$alkyl group, in particular $CH_3$, and p is from zero to 6, preferably from zero to 2, especially zero.

Units which contain a bound photoinitiator are, in particular, those of the formula E

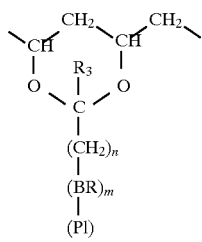 (E)

in which

BR is an 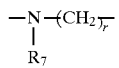 or

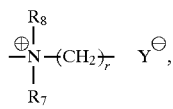

bridge or a quaternary salt thereof which has the formula N

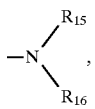, (N)

PI is the radical of a photoinitiator from the class consisting of the benzoins, such as benzoin ethers, for example benzoin methyl ether, benzoin ethyl ether, benzoin isopropyl ether and benzoin phenyl ether, and benzoin acetate; acetophenones, such as acetophenone, 2,2-dimethoxyacetophenone and 1,1-dichloroacetophenone; benzil, benzil ketals, such as benzil dimethyl ketal and benzil diethyl ketal; anthraquinones, such as 2-methylanthraquinone, 2-ethylanthraquinone, 2-tert-butyl anthraquinone, 1-chloroanthraquinone and 2-amylanthraquinone; furthermore benzophenones, such as benzophenone and 4,4'-bis(N,N'-dimethylamino) benzophenone; thioxanthones and xanthones; acridine derivatives; phenazine derivatives; quinoxaline derivatives; and 1-aminophenyl ketones and in particular 1-hydroxyphenyl ketones, in particular those of the formula

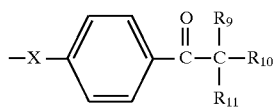

in which

X is —O—, —S— or —N($R_{12}$)—,

Y is a counterion, such as $H_2SO_4^\ominus$, $F^\ominus$, $Cl^\ominus$, $Br^\ominus$, $I^\ominus$, $CH_3COO^\ominus$, $OH^\ominus$, $BF_4^\ominus$ or $H_2PO_4^\ominus$, $R_3$ is hydrogen, a $C_1$–$C_6$alkyl group or a cycloalkyl group, $R_7$ is hydrogen; unsubstituted or substituted, linear or branched $C_1$–$C_{12}$alkyl; the —$(CH_2)_r$—PI group or the —CO—$R_{13}$ group, in which $R_{13}$ is linear or branched $C_1$–$C_6$alkyl which is unsubstituted or substituted by —COOH or acrylamide, or an unsubstituted, linear or branched radical of a $C_3$–$C_8$olefin, $R_8$ is hydrogen, or unsubstituted or substituted, linear or branched $C_1$–$C_4$alkyl so long as $R_7$ is not —CO—$R_{13}$, $R_9$ is unsubstituted or substituted, linear or branched $C_1$–$C_6$alkyl, unsubstituted or substituted, linear or branched $C_1$–$C_6$alkoxy, a 6-membered carbocyclic or heterocyclic ring, or an unsubstituted linear or branched radical of a $C_3$–$C_8$olefin, $R_{10}$ is a group of the formula —$OR_{14}$ or

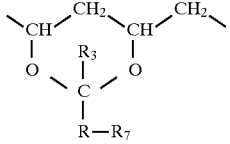, $R_{11}$, is unsubstituted or substituted, linear or branched $C_1$–$C_6$alkyl, a 6-membered carbocyclic or heterocyclic ring, an unsubstituted, linear or branched radical of a $C_3$–$C_8$olefin, or aryl, where $R_9$ and $R_{11}$, together can also be cyclized to form a 5- or 6-membered carbocyclic ring, $R_{12}$ is hydrogen or unsubstituted, linear or branched $C_1$–$C_4$alkyl, $R_{14}$ is hydrogen or unsubstituted or substituted, linear or branched $C_1C_4$alkyl, $R_{15}$ and $R_{16}$, independently of one another, are unsubstituted, linear or branched $C_1$–$C_4$alkyl, or $R_{15}$ and $R_{16}$ can be bonded together to form a 5- or 6-membered heterocyclic ring, m is 0 or 1, n is a number from 1 to 12, o is a number from 1 to 6, and r is a number from 2 to 6, where substituted radicals are substituted, in particular, by $C_1$–$C_4$alkyl or by $C_1$–$C_4$alkoxy, with the following provisos:

if the BR bridge is a quaternary salt, n is a number from 2 to 12;

$R_{14}$ is not hydrogen if $R_9$ is a $C_1$–$C_6$alkoxy radical; and $R_7$ is —CO—$R_{13}$ when n=1.

Examples of units containing basic groups are those of the formula F

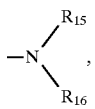 (F)

in which R is a linear or branched bivalent radical of a $C_1$–$C_{12}$alkane, and $R_3$ is hydrogen, a $C_1$–$C_6$alkyl group or a cycloalkyl group, and $R_7$ is a basic primary, secondary or tertiary amino group, in particular a secondary or tertiary amino group which is substituted by $C_1$–$C_6$alkyl, or a quaternary amino group of the formula

in which R' is hydrogen or, independently of one another, a $C_1$–$C_{12}$alkyl radical, in particular a $C_1$–$C_4$alkyl radical, and X is a counterion, for example $HSO_4^\ominus$, $F^\ominus$, $Cl^\ominus$, $Br^\ominus$, $I^\ominus$, $CH_3COO^\ominus$, $OH^\ominus$, $BF^\ominus$ or $H_2PO_4^\ominus$.

Examples of units containing acidic groups are those of the formula G

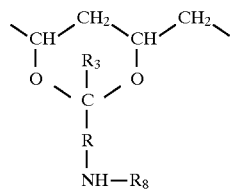

in which R and $R_3$ are as defined under the formula F, and $R_8$ is the radical of a monobasic, dibasic or tribasic aliphatic or aromatic, saturated or unsaturated organic acid.

Examples of units containing crosslinkable groups bonded via urethane or further modifier groups bonded via urethane are those of the formula H or J

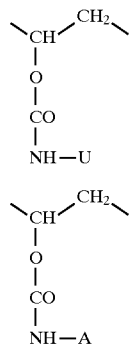

in which

U is the

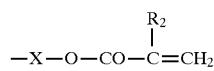

or —Y—NH—CO—O—Z—O—CH=$CH_2$ group, X is a bridge having 2 to 12 carbon atoms, in particular an aliphatic, cycloaliphatic or aromatic bridge, especially alkylene, cyclohexylene or phenylene, which are unsubstituted or in particular substituted by lower alkyl, $R_2$ is hydrogen or a $C_1$–$C_4$alkyl group, Y is a bridge having 7 to 12 carbon atoms with the same preferences as for X, Z is a $C_2$—to $C_{12}$alkylene bridge, which may be interrupted once or more than once by oxygen atoms, and A is an organic radical having 1 to 18 carbon atoms, in particular an aliphatic, cycloaliphatic or aromatic radical, especially alkyl, cycloalkyl or phenyl, which are unsubstituted or in particular substituted by lower alkyl.

The novel crosslinkable polymer (prepolymer) is soluble in water.

The crosslinkable polymer (prepolymer) used in accordance with the invention comprises the units containing one or more different crosslinkable group(s) and, if desired, the units containing the further modifier(s), reactive dye radicals and photoinitiators, etc, in a total amount of from about 0.5 to 80%, preferably from 1 to 50%, advantageously from 1 to 25%, in particular from 2 to 15%, particularly preferably from 2 to 10%, based on the number of functional groups in the starting polymer, for example hydroxyl groups in the polyvinyl alcohol.

Polymers (prepolymers) which can be crosslinked in accordance with the invention and are intended for the production of contact lenses comprise, in particular, from about 0.5 to about 25%, in particular from about 1 to 15%, particularly preferably from about 2 to 12%, of these units.

Surprisingly, crosslinkable tinted polymers are extremely stable. This is unexpected to the person skilled in the art since higher-functional acrylates, for example, usually require stabilization. If such compounds are not stabilized, rapid polymerization occurs. However, spontaneous crosslinking due to homopolymerization does not occur with the novel tinted, crosslinkable polymers. The crosslinkable tinted polymers can, in addition, be purified in a manner known per se, for example by precipitation with acetone, dialysis or ultrafiltration, particular preference being given to ultrafiltration. This purification operation allows the crosslinkable tinted polymers to be obtained in extremely pure form, for example as concentrated aqueous solutions, which are free or at least substantially free from reaction products, such as salts, and starting materials, or other non-polymeric constituents. In the case of ultrafiltration, the salts formed during neutralization of the reaction mixture and the salts present in the reactive dyes as impurities, for example sodium sulfate and sodium chloride, are also removed simultaneously.

The preferred method for the purification of the novel crosslinkable tinted polymers, ultrafiltration, which gives extremely pure products, can be carried out in a manner known per se. It is possible to carry out the ultrafiltration repeatedly, for example from two to ten times. Alternatively, the ultrafiltration can also be carried out continuously until the desired degree of purity has been achieved. The desired degree of purity can in principle be as great as desired. A suitable measure of the degree of purity is, for example, the GPC or the elemental analysis (for example chlorine content of the filtrate).

The novel tinted, high-purity, crosslinkable polymers can be crosslinked in an extremely effective and targeted manner, in particular by photochemical crosslinking.

The present invention therefore furthermore relates to a photocrosslinked, tinted polymer which can be obtained by photocrosslinking a crosslinkable, tinted polymer comprising covalently bonded reactive dye radicals in the presence or absence of an additional vinylic comonomer. These photocrosslinked, tinted polymers (hydrogels) are insoluble in water.

In the case of photochemical crosslinking (photocrosslinking), it is expedient, especially where necessary, to add a photoinitiator which is capable of initiating free-radical crosslinking. The crosslinking can then be initiated by actinic or ionizing radiation.

The photocrosslinking is carried out in a suitable solvent. Such solvents are in principle all those which dissolve the crosslinkable tinted polymer and any vinylic comonomers additionally used.

The photocrosslinking is preferably carried out directly from an aqueous solution of the novel water-soluble, crosslinkable tinted polymers, which can be obtained as a result of the preferred purification step, namely ultrafiltration, if desired after addition of an additional vinylic comonomer.

The process for the preparation of the novel crosslinkable tinted polymers comprises, for example, derivatizing a polymer backbone with a crosslinking agent, where the polymer backbone is still capable of reacting covalently with a reactive dye, in particular a polyvinyl alcohol polymer backbone, and photocrosslinking the derivatized backbone, in particular in essentially pure form, ie. for example, after a single or repeated ultrafiltration, in particular in aqueous solution, in the presence or absence of an additional vinylic comonomer.

The vinylic comonomer which can additionally be used in the photocrosslinking can be hydrophilic, hydrophobic or a mixture of hydrophobic and hydrophilic vinylic monomers. Suitable vinylic monomers include, in particular, those which are usually used in the production of contact lenses. The term "hydrophilic vinylic monomer" is taken to mean a monomer which, as a homopolymer, typically gives a polymer which is soluble in water or is capable of absorbing at least 10% by weight of water. Analogously, the term "hydrophobic vinylic monomer" is taken to mean a monomer which, as a homopolymer, typically gives a polymer which is insoluble in water or is capable of absorbing less than 10 per cent by weight of water.

If a vinylic comonomer is used, the photocrosslinked tinted novel polymers preferably comprise from about 1 to 15 per cent, particularly preferably from about 3 to 8 per cent, of crosslinkable units, based, for example, on the number of hydroxyl groups of the polyvinyl alcohol, which are reacted with from about 0.1 to 80 units of the vinylic monomer.

The proportion of vinylic comonomers, if used, is preferably from 0.5 to 80 units per crosslinkable unit, in particular from 1 to 30 units of vinylic comonomer per crosslinkable unit, particularly preferably from 5 to 20 units per crosslinkable unit.

It is furthermore preferred to use a hydrophobic vinylic comonomer or a mixture of a hydrophobic vinylic comonomer and a hydrophilic vinylic comonomer which comprises at least 50 per cent by weight of a hydrophobic vinylic comonomer. This allows the mechanical properties of the photocrosslinked polymer to be improved without drastically reducing the water content. However, both conventional hydrophobic vinylic comonomers and conventional hydrophilic vinylic comonomers are in principle suitable for the copolymerization.

Suitable hydrophobic vinylic comonomers include, without this being a comprehensive list, $C_1$–$C_{18}$alkyl acrylates and methacrylates, $C_3$–$C_{18}$alkylacrylamides and -methacrylamides, acrylonitrile, methacrylonitrile, vinyl $C_1$–$C_{18}$alkanoates, $C_2$–$C_{18}$alkenes, $C_2$–$C_{18}$haloalkenes, styrene, $C_1$–$C_6$alkylstyrene, vinyl alkyl ethers in which the alkyl moiety has 1 to 6 carbon atoms, C2–$C_{10}$perfluoroalkyl acrylates and methacrylates and correspondingly partially fluorinated acrylates and methacrylates, $C_3$–$C_{12}$perfluoroalkyl ethylthiocarbonylaminoethyl acrylates and -methacrylates, acryloxy- and methacryloxyalkylsiloxanes, N-vinylcarbazole, $C_1$–$C_{12}$alkyl esters of maleic acid, fumaric acid, itaconic acid, mesaconic acid and the like. Preference is given to, for example, $C_1$–$C_4$alkyl esters of vinylically unsaturated carboxylic acids having 3 to 5 carbon atoms or vinyl esters of carboxylic acids having up to 5 carbon atoms.

Examples of suitable hydrophobic vinylic comonomers include methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethylthiocarbonylaminoethyl methacrylate, isobornyl methacrylate, trifluoroethyl methacrylate, hexafluoroisopropyl methacrylate, hexafluorobutyl methacrylate, tris (trimethylsilyloxy)silylpropyl methacrylate, 3-methacryloxypropyl-pentamethyldisiloxane and bis (methacryloxypropyl)tetramethyldisiloxane.

Suitable hydrophilic vinylic comonomers include, without this being a comprehensive list, hydroxy-substituted lower alkyl acrylates and methacrylates, acrylamide, methacrylamide, lower alkylacrylamides and -methacrylamides, methoxylated acrylates and methacrylates, hydroxy-substituted lower alkylacrylamides and -methacrylamides, hydroxy-substituted lower alkyl vinyl ethers, sodium ethylenesulfonate, sodium styrenesulfonate, 2-acrylamido-2-methylpropanesulfonic acid, N-vinylpyrrole, N-vinylsuccinimide, N-vinylpyrrolidone, 2- and 4-vinylpyridine, acrylic acid, methacrylic acid, amino- (where the term "amino" also covers quatemary ammonium), mono(lower alkyl)amino- or di(lower alkyl)amino(lower alkyl) acrylates and methacrylates allyl alcohol and the like. Preference is given to, for example, hydroxy-substituted C2–$C_4$alkyl (meth)acrylates, five-to seven-membered N-vinyllactams, N,N-di-$C_1$–$C_4$alkyl(meth)acrylamides and vinylically unsaturated carboxylic acids having a total of 3 to 5 carbon atoms.

Examples of suitable hydrophilic vinylic comonomers include hydroxyethyl methacrylate, hydroxyethyl acrylate, acrylamide, methacrylamide, dimethylacrylamide, allyl alcohol, vinylpyridine, vinylpyrrolidone, glycerol methacrylate, N-(1,1-dimethyl-3-oxobutyl)acrylamide and the like.

Preferred hydrophobic vinylic comonomers are methyl methacrylate and vinyl acetate.

Preferred hydrophilic vinylic comonomers are 2-hydroxyethyl methacrylate, N-vinylpyrrolidone and acrylamide.

The novel crosslinkable tinted homopolymers and copolymers can be converted into mouldings, in particular contact lenses, in a manner known per se, for example by carrying out the crosslinking, in particular photocrosslinking, in a suitable contact-lens mould. The invention therefore furthermore relates to mouldings essentially comprising a crosslinked tinted polymer made from a novel crosslinkable tinted polymer comprising units containing a crosslinkable group and units containing a reactive dye radical. Further examples of novel mouldings, besides contact lenses, are biomedical mouldings and mouldings for specifically ophthalmic purposes, for example intraocular lenses, eye bandages, mouldings which can be used in surgery, such as heart valves, artificial arteries or the like, furthermore films and membranes, for example membranes for diffusion control, photostructurable films for information storage, and photoresist materials, for example membranes and mouldings for etch resists and screen printing resists.

A specific embodiment of the invention relates to contact lenses which comprise a novel tinted crosslinked polymer made from a crosslinkable tinted polymer or essentially comprising or consisting of a novel crosslinked tinted polymer. Contact lenses of this type have a range of unusual and extremely advantageous properties, including, for example, excellent compatibility with the human cornea, based on a balanced ratio between water content (about 50–90% by weight, in particular 60–85% by weight), high oxygen permeability and very good mechanical properties, for example softness (hydrogels), transparency, clarity, freedom from stresses and tear strength. In addition, the novel tinted contact lenses have high dimensional stability and have very homogeneous tinting or colouring. Even after autoclaving one or more times at, for example, about 120° C. for about 30–40 minutes, no changes in shape are observed. If the novel tinted contact lenses are used as one-day lenses, they additionally require no care products. Furthermore, they are economically advantageous to produce. The tinted novel contact lenses are colour-fast to all types of sterilization treatment, such as chemical, enzymatic and heat sterilization.

It is furthermore emphasized that the novel tinted contact lenses can be produced very simply, efficiently and quickly compared with the prior art. This is due to a number of factors. Firstly, the starting materials, such as the polymer backbones, are inexpensive to obtain or prepare. Secondly, it is advantageous that the crosslinkable polymers and the crosslinkable tinted polymers are surprisingly stable, so that they can be subjected to very substantial purification. The crosslinking can therefore be carried out using a crosslinkable tinted polymer which requires virtually no subsequent purification, such as, in particular, complex extraction of unpolymerized constituents. Furthermore, the crosslinking can be carried out in purely aqueous solution, so that a subsequent hydration step is unnecessary. In addition, the reaction times during tinting of the polymers are very short. Finally, the photocrosslinking takes place within less than 5 minutes, so that the process for the production of the novel tinted contact lenses can be designed to be extremely economical from this point of view too.

All the above advantages naturally apply not only to contact lenses, but also to the other mouldings mentioned. The totality of the various advantageous aspects in the production of novel tinted mouldings results in the novel tinted mouldings being particularly suitable as mass-produced articles, for example as contact lenses, which are worn for a short time span (from about 1 to 4 days) and are then replaced by new lenses.

The present invention furthermore relates to the production of the novel tinted mouldings, in particular the novel tinted contact lenses. These processes are illustrated below using the example of contact lenses. However, these processes can also be used for the other mouldings mentioned.

The novel tinted contact lenses can be produced in a manner known per se, for example in a conventional spin-casting mould, as described, for example, in U.S. Pat. No. 3,408,429, or by the full-mould process in a static mould, as described, for example, in U.S. Pat. No. 4 347 198.

It has been found that the process described above with reference to crosslinkable tinted polymers comprising, in particular, units of the formula I is of general applicability. The present invention therefore also relates to a novel process for the production of polymeric tinted mouldings, in particular tinted contact lenses, in which a water-soluble crosslinkable tinted polymer containing reactive dye radicals is crosslinked in solution, and to mouldings, in particular contact lenses, obtainable by this process. The tinted mouldings obtainable by crosslinking in this way are insoluble, but swellable, in water.

In detail, this process for the production of tinted mouldings, in particular tinted contact lenses, comprises the following steps:
  a) Preparation of an essentially aqueous solution of a water-soluble crosslinkable tinted polymer comprising units containing a crosslinkable group and units containing a bonded reactive dye radical,
  b) introduction of the resultant solution into a mould,
  c) initiation of the crosslinking in water or in an organic solvent in which the crosslinkable tinted polymer is dissolved, and
  d) opening of the mould so that the moulding can be removed.

Unless expressly excluded below, the comments and preferences given above in connection with the crosslinkable tinted polymers comprising units of the formula I and the comments and preferences given in connection with the processes for the preparation of polymers and production of mouldings, in particular contact lenses, from these crosslinkable tinted polymers also apply in connection with the above-described process comprising steps a), b), c) and d). This statement applies to all the cases in which the comments and preferences in connection with crosslinkable tinted polymers comprising units of the formula I can be applied appropriately to the process described above.

The crucial criteria regarding whether a crosslinkable tinted polymer can be employed in the novel process are that the crosslinkable tinted polymer comprises units containing a crosslinkable group and units containing a bonded reactive dye radical, and that this polymer is soluble in water.

An essentially aqueous solution of a water-soluble crosslinkable tinted polymer can be prepared in a manner known per se, for example by isolating the crosslinkable tinted polymer, for example in pure form, ie. free from undesired constituents, and dissolving the crosslinkable tinted polymer in an essentially aqueous medium.

The criterion that the crosslinkable tinted polymer is soluble in water is, for the purposes of the invention, taken to mean in particular that the crosslinkable tinted polymer is soluble in an essentially aqueous solution at 20° C. in a concentration of from about 3 to 90 per cent by weight, preferably from about 5 to 60 per cent by weight, in particular from about 10 to 60 per cent by weight. If possible in individual cases, crosslinkable tinted polymer concentrations of greater than 90% are also included for the purposes of the invention. Particular preference is given to crosslinkable tinted polymer concentrations in solution of from about 15 to about 50 per cent by weight, in particular from about 15 to about 40 per cent by weight, for example from about 25 to about 40 per cent by weight.

For the purposes of this invention, essentially aqueous solutions of the crosslinkable tinted polymer include in particular solutions in water, in aqueous salt solutions, in particular in aqueous salt solutions having an osmolarity of from about 200 to 450 milliosmol in 1000 ml (unit: mOsm/l), preferably an osmolarity of from about 250 to 350 mOsm/l, in particular about 300 mOsm/l, or in mixtures of water or aqueous salt solutions with physiologically acceptable polar organic solvents, for example glycerol. Preference is given to solutions of the crosslinkable tinted polymers in water alone.

The aqueous salt solutions are advantageously solutions of physiologically acceptable salts, such as buffer salts, for example phosphate salts, which are conventional in the area of contact-lens care, or isotonicizing agents, in particular alkali metal halides, for example sodium chloride, which are conventional in the area of contact-lens care, or solutions of mixtures thereof. An example of a particularly suitable salt solution is an artificial, preferably buffered tear fluid whose pH and osmolarity have been matched to natural tear fluid, for example an unbuffered, preferably buffered for example by phosphate buffer, sodium chloride solution whose osmolarity and pH conform to the osmolarity and pH of human tear fluid.

The above-defined, essentially aqueous solutions of the crosslinkable tinted polymer are preferably pure solutions, ie. those which are free or essentially free from undesired constituents. Particular preference is given to solutions of the crosslinkable tinted polymer in pure water or in an artificial tear fluid as described above.

The viscosity of the solution of the crosslinkable tinted polymer in the essentially aqueous solution is unimportant over broad limits. However, it should preferably be a flowable solution which can be shaped without stresses.

The molecular weight of the crosslinkable tinted polymer is likewise unimportant within broad limits. However, the crosslinkable tinted polymer preferably has a molecular weight of from about 10,000 to about 200,000.

The crosslinkable tinted polymer used in accordance with the invention should furthermore, as mentioned, comprise crosslinkable groups. The term crosslinkable groups is taken to mean, in addition to the acetal groups mentioned at the outset containing crosslinkable groups, all conventional crosslinkable groups known to the person skilled in the art, for example photocrosslinkable or thermally crosslinkable groups. Particularly suitable crosslinkable groups are those as already proposed under the production of contact-lens materials. These include, in particular, but not exclusively, groups which contain carbon-carbon double bonds. In order to demonstrate the variety of crosslinkable groups which are suitable, crosslinking mechanisms which may be mentioned here, merely by way of example, are free-radical polymerization, 2+2 cycloaddition, Diels-Alder reaction, ROMP (ring opening metathesis polymerization), vulcanization, cationic crosslinking and epoxy curing.

Suitable polymeric backbones, in addition to the starting polymers already mentioned at the outset, are materials as have in some cases already been proposed as contact-lens materials and which are capable of covalently binding reactive dyes, for example polymeric diols other than PVA, polymers comprising saccharides, polymers comprising vinylpyrrolidone, polymers comprising alkyl (meth) acrylates, polymers comprising alkyl (meth)acrylates which are substituted by hydrophilic groups, such as hydroxyl, carboxyl or amino groups, polyalkylene glycols, or copolymers or mixtures thereof.

As already mentioned, for a crosslinkable tinted polymer to be suitable in the novel process, it is essential that it is crosslinkable. However, the crosslinkable polymer is uncrosslinked so that it is water-soluble.

Furthermore, the crosslinkable polymer and the crosslinkable tinted polymer are advantageously stable in the uncrosslinked state, so that they can be subjected to purification, as described above. The crosslinkable tinted polymers are preferably employed in the crosslinking process in the form of pure solutions. The crosslinkable tinted polymers can be converted into the form of pure solutions as described below, for example.

The water-soluble, crosslinkable tinted polymers used in the novel process can preferably be purified in a manner known per se, for example by precipitation with organic solvents, such as acetone, filtration and washing, extraction in a suitable solvent, dialysis or ultrafiltration, particular preference being given to ultrafiltration. This purification operation allows the crosslinkable tinted polymers to be obtained in extremely pure form, for example as concentrated aqueous solutions, which are referred to hereinafter as pure or essentially pure. This term is understood to refer to a crosslinkable polymer or to a solution thereof which is free or at least substantially free from undesired constituents.

Undesired constituents in this context are generally all constituents which are physiologically undesired, especially monomeric, oligomeric or polymeric starting compounds used for the preparation of the water-soluble, crosslinkable tinted polymer, or byproducts formed during the preparation of the water-soluble, crosslinkable tinted polymer. Preferred degrees of purity of these constituents are less than 0.01%, in particular less than 0.001%, very particularly preferably less than 0.0001% (1 ppm). It is to be noted, however, that there may be present in the solution, for example by formation as byproducts during the preparation of the water-soluble, crosslinkable tinted polymer, constituents which are not undesired from a physiological point of view, such as for example sodium chloride. Preferred degrees of purity of these constituents are less than 1%, in particular less than 0.1%, very particularly preferably less than 0.01%. In most cases such levels of constituents may be obtained by applying 3 to 4 repeated ultrafiltration cycles.

The preferred process for the purification of the crosslinkable tinted polymers used in the crosslinking process, namely ultrafiltration, can be carried out in a manner known per se. The ultrafiltration can be carried out repeatedly, for example from two to ten times. Alternatively, the ultrafiltration can also be carried out continuously until the desired degree of purity has been achieved. The desired degree of purity can in principle be chosen to be as great as desired.

In a preferred embodiment of the process for the production of tinted contact lenses, an essentially aqueous solution of the crosslinkable tinted polymer which is essentially free from undesired constituents, for example free from monomeric, oligomeric or polymeric starting compounds used for the preparation of the crosslinkable tinted polymer, and/or free from by-products formed during the preparation of the crosslinkable tinted polymer, is prepared in step a) and used further. This essentially aqueous solution is particularly preferably a purely aqueous solution or a solution in an artificial tear fluid as described above. It is furthermore preferred for the process to be carried out without addition of a comonomer, for example a vinylic comonomer.

Owing to the abovementioned measures and in particular owing to a combination of said measures, the crosslinking process is carried out using a solution of the crosslinkable tinted polymer containing no or essentially no undesired constituents requiring extraction after crosslinking. It is therefore a particular feature of this preferred embodiment of the process that extraction of undesired constituents is not necessary after the crosslinking.

The crosslinking process is therefore preferably carried out in such a way that the essentially aqueous solution of the crosslinkable tinted polymer is free or essentially free from undesired constituents, in particular from monomeric, oligomeric or polymeric starting compounds used for the preparation of the crosslinkable tinted polymer, or from by-products formed during the preparation of the crosslinkable tinted polymer, and/or that the solution is used without addition of a comonomer.

An addition which may be added to the solution of the crosslinkable tinted polymer (or a mixture of such polymers) is a photoinitiator for the crosslinking so long as an initiator is necessary for crosslinking. This may be the case, in particular, if the crosslinking takes place by photocrosslinking, which is preferred in the novel process.

If, however, the crosslinkable tinted polymer comprises units containing a photoinitiator component, the crosslinking can be carried out directly without addition of an additional photo initiator.

In the case of photocrosslinking, it is expedient to add an initiator which is capable of initiating free-radical crosslinking and is readily soluble in water. Examples thereof are known to the person skilled in the art; suitable photoinitiators which may be mentioned specifically are benzoins, such as benzoin, benzoin ethers, such as benzoin methyl ether, benzoin ethyl ether, benzoin isopropyl ether and benzoin phenyl ether, and benzoin acetate; acetophenones, such as acetophenone, 2,2-dimethoxyacetophenone and 1,1-dichloroacetophenone; benzil, benzil ketals, such as benzil dimethyl ketal and benzil diethyl ketal, anthraquinones, such as 2-methylanthraquinone, 2-ethylanthraquinone, 2-tert-butyl-anthraquinone, 1-chloroanthraquinone and 2-amylanthraquinone; furthermore triphenyl-phosphine, benzoylphosphine oxides, for example 2,4,6-trimethylbenzoyldiphenylphos-phine oxide, benzophenones, such as benzophenone and 4,4'-bis(N,N'-dimethylamino)-benzophenone; thioxanthones and xanthones; acridine derivatives; phenazine derivatives; quinoxaline derivatives and 1-phenyl-1,2-propanedione 2–0-benzoyl oxime; 1-amino-phenyl ketones and 1-hydroxyphenyl ketones, such as 1-hydroxycyclohexylphenyl ketone, phenyl 1-hydroxyisopropyl ketone, 4-isopropylphenyl 1-hydroxyisopropyl ketone, 2-hydroxy- 1-[4-(2-hydroxyethoxy)phenyl]-2-methylpropan- 1-one, 1-phenyl-2-hydroxy-2-methylpropan-1-one, and 2,2-dimethoxy-1,2-diphenylethanone, all of which are known compounds.

Particularly suitable photoinitiators, which are usually used in combination with UV lamps as light source, are acetophenones, such as 2,2-dialkoxybenzophenones and hydroxyphenyl ketones, for example the initiators obtainable under the trade names Irgacure® 2959 and Irgacure® 81173.

Another class of photoinitiators usually employed when argon ion lasers are used are benzil ketals, for example benzil dimethyl ketal.

The photoinitiators are added in effective amounts, expediently in amounts of from about 0.1 to about 2.0% by weight, in particular from 0.2 to 0.5% by weight, based on the total amount of the crosslinkable tinted polymer.

The resultant solution can be introduced into a mould using methods known per se, such as, in particular, conventional metering, for example dropwise. The novel tinted contact lenses can be produced in a manner known per se, for example in a conventional spin-casting mould, as described, for example, in U.S. Pat. No. 3,408,429, or by the full-mould process in a static mould, as described, for example, in U.S. Pat. No. 4,347,198. Appropriate moulds are made, for example, of polypropylene. Examples of suitable materials for reusable moulds are quartz and sapphire glass.

The novel crosslinkable tinted polymers which are suitable can be crosslinked by irradiation with ionizing or actinic radiation, for example electron beams, X-rays, UV or VIS light, ie. electromagnetic radiation or particle radiation having a wavelength in the range from about 250 to 650 nm. Also suitable are He/Cd, argon or nitrogen or metal vapour or NdYAG laser beams with multiplied frequency. It is known to the person skilled in the art that each selected light source requires selection and, if necessary, sensitization of the suitable photoinitiator. It has been recognized that in most cases the depth of penetration of the radiation into the crosslinkable polymer and the rate are in direct correlation with the absorption coefficient and concentration of the photoinitiator.

The crosslinking can, if desired, also be initiated thermally. It should be emphasized that the crosslinking can take place in a very short time in accordance with the invention, for example in less than five minutes, preferably in less than one minute, in particular in up to 30 seconds, particularly preferably as described in the examples.

Apart from water, which is preferred, the crosslinking medium can additionally be any medium in which the crosslinkable tinted polymer is soluble. In the case of polyvinyl alcohol as the polymer backbone, for example, all solvents which dissolve polyvinyl alcohol are suitable, such as alcohols, for example glycols, glycerol, piperazine (at elevated temperature), diamines, such as triethylenediamine, formamide, dimethylformamide, hexamethylphosphoric triamide, dimethyl sulfoxide, pyridine, acetonitrile and dioxane.

The opening of the mould so that the moulding can be removed can be carried out in a manner known per se. Whereas the process proposed in the prior art (U.S. Pat. No. 3,408,429 and 4,347,198) requires subsequent purification steps at this point, for example by extraction, and also steps for hydration of the resultant mouldings, in particular contact lenses, such steps are unnecessary here.

Since the solution of the crosslinkable tinted polymer preferably comprises no undesired low-molecular-weight constituents, the crosslinked tinted product also comprises no such constituents. Subsequent extraction is therefore unnecessary. Since the crosslinking is carried out in an essentially aqueous solution, subsequent hydration is unnecessary. These two advantages mean, inter alia, that complex subsequent treatment of the resultant tinted mouldings, in particular contact lenses, is unnecessary. The tinted contact lenses obtainable by the novel process are therefore distinguished, in an advantageous embodiment, by the fact that they are suitable for their intended use without extraction. The term 'intended use' in this connection is taken to mean, in particular, that the contact lenses can be employed in the human eye. The contact lenses obtainable by the crosslinking process are furthermore distinguished in an advantageous embodiment by the fact that they are suitable for their intended use without hydration.

This process therefore proves to be extremely suitable for the efficient production of a large number of mouldings, such as contact lenses, in a short time. The tinted contact lenses obtainable by this process have, inter alia, the advantages over the contact lenses known from the prior art that they can be used as intended without subsequent treatment steps, such as extraction or hydration. In addition, virtually any desired shade or any tint can be achieved by using a specific reactive dye or a combination of reactive dyes. Bleeding of the dye does not occur, nor does leaching out, neither in the tear fluid nor in the sterilization solution.

The examples below serve to further illustrate the invention. In the examples, unless expressly stated otherwise, amounts are by weight and temperatures are given in degrees Celsius. RT denotes room temperature of about 20° C. These examples are not intended to represent any restriction of the invention, for example to the scope of the examples.

EXAMPLE 1

220 g (5.5 mol) of sodium hydroxide are dissolved in 300 g of water and 700 g of ice in a 3 liter reactor fitted with stirrer and cooling means. The sodium hydroxide solution is cooled to 10° C., and 526 g (5.0 mol) of aminoacetaldehyde dimethyl acetal and 50 mg of 4-hydroxy-2,2,6,6-tetramethylpiperidine 1-oxide (free-radical inhibitor) are added. 548.6 g (5.5 mol) of methacryloyl chloride are slowly added to this solution at 10° C. over the course of 3.5 hours. When the addition is complete, the pH slowly drops to 7.2, and amine is no longer detectable by GC. The reaction mixture is extracted with 500 ml of petroleum ether in order to remove impurities, and the water phase is saturated with sodium chloride and extracted three times with 500 ml of tert-butyl methyl ether. The organic phase is dried using magnesium sulfate, filtered and evaporated on a rotary evaporator. The 882.2 g of yellowish oil obtained are slowly stirred into 2000 ml of petroleum ether at −10° C. using an Ultraturax. The product crystallizes, and is filtered off and dried, giving 713.8 g of methacrylamidoacetaldehyde dimethyl acetal (86% of theory), melting point 30–32° C. The product is 99.7% pure according to GC.

EXAMPLE 2

General method for the preparation of high-acetate products; of the reaction of PVA with acetals or aldehydes.

300 g of a PVA (Mowiol 4–88, unless stated otherwise) are introduced into a 2 liter twin-jacket reactor fitted with stirrer and thermometer, 800 g of demineralized water are added, and the mixture is warmed to 95° C. with stirring. After one hour, all the reactants have dissolved to give a clear solution, which is cooled to 20° C. 27 g (0.155 mol) of methacrylamidoacetaldehyde dimethyl acetal (from Example 1), 440 g of acetic acid, 100 g of conc. hydrochloric acid (37%) and sufficient demineralized water to give a total of 200 g of reaction solution are added. The mixture is stirred at 20° C. for 20 hours.

Isolation can be carried out by ultrafiltration: the reaction mixture is cooled to 15° C. and the pH is adjusted to 3.6 by means of aqueous NaOH (5%). The polymer solution is filtered through a 0.45 μm filter and purified by ultrafiltration. The ultrafiltration is carried out using a 1 KD Omega membrane from Filtron. The ultrafiltration is continued to a residual sodium chloride content of 0.004%. Before the purification is completed, the solution is adjusted to pH =7 using 0.1N sodium hydroxide solution. Concentration gives 1995 g of a crosslinkable 14.54% polymer solution (92% of theory); N content (Kjeldahl determination) =0.683%, acetate content (determined by hydrolysis) =2.34 meq/g, intrinsic viscosity =0.310, 0.5 meq/g of double bonds (determined by microhydrogenation), 15.3 meq/g of free hydroxyl groups (determined by re-acetylation), GPC analysis (in water): $M_w$=19,101, $M_n$=7522, $M_w/M_n$=2.54.

The isolation can also be carried out by precipitation: the reaction mixture is adjusted to pH 3.6 by means of triethylamine and precipitated in acetone in a ratio of 1:10. The precipitate is separated off, dispersed twice in ethanol and once in acetone and dried. The resultant product has the same properties as that obtained above by ultrafiltration.

EXAMPLE 3

General procedure for the acid hydrolysis of VP-VAc polymers. Luviskol VA (BASF) or VP-VAc copolymer (Aldrich) comprising from 18 to 70 percent by weight of VP is introduced as a 10 percent by weight solution in methanol or in methanol/water (10–90% of water). An equimolar amount of acid, namely conc. sulfuric acid (95%), conc. hydrochloric acid (37%) or highly acidic ion exchanger, corresponding to the VAc content is added, and the mixture is then heated to the reflux temperature. The course of the reaction is monitored by periodic sampling and titration with 0.1N KOH solution (for example Mettler DL 40 titrator) (determination of the concentration of the acetic acid formed). The hydrolysis is terminated either when the desired degree of hydrolysis has been reached or the hydrolysis is complete (concentration of the acetic acid reaches a constant value). For complete hydrolysis, a reaction time of 1–2 days is required. Complete hydrolysis does not necessarily mean that all the hydrolysable ester groups have been removed, but instead that the hydrolysis has ceased. The methanolic reaction solution is subsequently passed through a column containing basic ion exchanger which has been washed neutral (Merck; 1.2 molar with respect to the acid employed) in order to remove the acetic acid, and is evaporated on a rotary evaporator. The evaporated solution is sheeted out and dried in air for a few days and then at 40° C. and 0.1 mbar (10 Pa) to constant weight. Alternatively, the evaporated solution can be diluted with water and freed from residual alcohol in a rotary evaporator; the aqueous solution remaining is then spray-dried. The resultant starting polymers are readily soluble in water, alcohols (lower alkanols), dimethylformamide (DMF), N,N-dimethylacetamide (DMA) and dimethyl sulfoxide (DMSO).

EXAMPLE 4

In each case, 30 ml of a 14 percent by weight PVA solution from Example 2 are stirred for 1 minute with various volumes (V) as shown in Table 1 of 0.5 percent by weight sodium carbonate solution. 60 mg of a Duasyn-Rot R-F3B solution are added in each case, and the mixtures are stirred for 2 minutes at RT while the pH is monitored. The calculated amount of 0.01N HCl solution for neutralization is then added. Thin-layer chromatography (TLC; stationary phase silica gel 60 $F_{254}$ on aluminium foil, layer thickness 0.2 mm; Merck) in acetone shows no unbound dye. The mixture is subjected to ultrafiltration through a 3 kD membrane (Filtron) in an ultrafiltration cell (Berghof) until chloride is no longer detectable by argentometry. The concentration of the solution can likewise be carried out in the ultrafiltration cell or by vacuum distillation (140 mbar, 40° C.) with blowing-in of air, or the solution freed from salts is precipitated in acetone and the resultant solid is dried in vacuo.

TABLE 1

| Ex. | V (sodium carbonate)/ml | pH before addition of dye | pH after addition of dye | V (hydrochloric acid)/ml | pH after addition of hydrochloric acid |
|---|---|---|---|---|---|
| 4a) | 10 | 10.8 | 10.6 | 50 | 6.5 |
| 4b) | 5 | 10.7 | 10.5 | 20 | 6.8 |
| 4c) | 1 | 9.1 | 8.5 | 4 | 6.4 |
| 4d) | 0.5 | 6.4 | 6.4 | 1.5 | 5.9 |

EXAMPLE 5

A mixture of 15 ml of a 30 percent by weight aqueous solution of polyethyleneimine (Polysciences) and 15 ml of demineralized water (pH of the mixture: 10.5) is adjusted to a pH of 6.8 using 3 ml of 37% hydrochloric acid. 5 ml of 0.5 percent sodium carbonate solution (pH 7.2) are added, followed by 60 mg of a Duasyn-Blau R-R solution (pH 7.4), and the pH is adjusted to 7.2 by means of 20 ml of 0.01N hydrochloric acid. TLC in acetone shows no unbound dye.

EXAMPLE 6

A solution of 3.00 g of a terpolymer of vinylpyrrolidone (43.4 percent by weight), vinyl acetate (25.2 percent by weight) and vinyl alcohol (31.4 percent by weight) prepared as described in Example 3 (prepared from Luviskol VA 37 HM (BASF)) in 60 ml of demineralized water (pH 8.3) is stirred for 1 minute with 5 ml of 0.5 percent sodium carbonate solution (pH 10.8). 40 mg of a Duasyn-Blau R-KG solution (pH 10.8) are added, and the mixture is stirred for 2 minutes. After addition of 30 ml of 0.01N hydrochloric acid, the pH is 6.5. TLC shows no unbound dye.

EXAMPLE 7

In each case, 30 ml of a 14 percent by weight crosslinkable PVA solution as per Example 2 (with the acetal from Example 1) are stirred for 1 minute with 5 ml of demineralized water and 5 ml of a 0.5 percent sodium carbonate solution, and a dye as shown in Table 2, dissolved in 1 ml of demineralized water, is then added. After a reaction time of 8 minutes, during which a sample is taken every minute for TLC and the pH slowly drops somewhat, the mixture is neutralized by means of 20 ml of 0.01N hydrochloric acid. TLC in acetone shows no free dye.

TABLE 2

| Ex. | Dye | Amount of dye/mg | pH before addition of dye | pH after a reaction time of 8 minutes | pH after addition of the hydrochloric acid |
|---|---|---|---|---|---|
| 7a) | Duasyn-Gelb R-Gl | 60 | 10.6 | 9.9 | 6.2 |
| 7b) | Duasyn-Rot R-F3B | 60 | 10.6 | 10.1 | 6.4 |
| 7c) | Duasyn-Blau R-KG | 30 | 10.6 | 10.0 | 6.4 |
| 7d) | Duasyn-Grün R-K6B | 30 | 10.6 | 10.3 | 6.7 |
| 7e) | Duasyn-Schwarz R-KRL | 45 | 10.7 | 10.2 | 6.6 |
| 7f) | Duasyn-Schwarz R-N | 30 | 10.6 | 10.2 | 6.5 |
| 7g) | Remazol Brillantblau B | 15 | 10.8 | 10.2 | 6.5 |
| 7h) | Remazol Brillantblau BB | 15 | 10.5 | 10.2 | 6.5 |
| 7i) | Remazol Druckschwarz G | 15 | 10.8 | 10.2 | 6.6 |

EXAMPLE 8

In each case, 30 ml of a 15 percent by weight solution of Mowiol 4–88 (PVA from Hoechst AG) are stirred for 1 minute with 5 ml of demineralized water and 5 ml of a 0.5 percent sodium carbonate solution, and, at room temperature, a solution of 15 mg of a dye as shown in Table 3 in 1 ml of water are added. The conversion is monitored by sampling for TLC in acetone.

TABLE 3

| Ex. | Dye | TLC results |
|---|---|---|
| 8a) | Remazol Brillantblau B | no free dye detectable |
| 8b) | Remazol Brillantblau BB | no free dye detectable |
| 8c) | Remazol Schwarz B | no free dye detectable after 3 minutes |

EXAMPLE 9

Batches as in Example 8, reaction temperature 50° C.: dyes as shown in Table 4.

TABLE 4

| Ex. | Dye | TLC results |
|---|---|---|
| 9a) | Remazol Brillantblau B | no free dye detectable |
| 9b) | Remazol Brillantblau BB | no free dye detectable |
| 9c) | Remazol Brillantblau R | no free dye detectable after a reaction time of 1–2 minutes |
| 9d) | Remazol Brillantblau R spez. | no free dye detectable after a reaction time of 1–2 minutes |
| 9e) | Remazol Gelb GR | no free dye detectable after a reaction time of 3 minutes |

EXAMPLE 10

50 ml of a 14 percent by weight crosslinkable PVA solution as per Example 2 (with the acetal from Example 1) (pH 6.2) are stirred for 1 minute with 8 ml of a 0.5 percent sodium carbonate solution (pH 10.8) and then for 3 minutes with a solution of 50 mg of Duasyn-Blau R-KG in 1 ml of water (pH 10.7 after 1 minute; pH 10.6 after 2 minutes). After this time, the mixture is neutralized (pH 7.0) by means of 30 ml of 0.01N hydrochloric acid. TLC in acetone shows no free dye. The solution is made up to 400 ml twice and subjected to ultrafiltration through a 3 kD membrane (Filtron) in an ultrafiltration cell (Berghof) until no chloride can be detected by argentometry. A further concentration to 33 percent by weight is carried out by vacuum distillation (140 mbar, 40° C.) and blowing-in of air.

EXAMPLE 11

50 ml of a 14 percent by weight crosslinkable PVA solution as per Example 2 (with the acetal from Example 1) (pH 6.44) are stirred for 1 minute with 8 ml of a 0.5 percent sodium carbonate solution (pH 10.84) and then for 4 minutes with a solution of 100 mg of Duasyn-Rot R-F3B in 1 ml of water (pH 10.6 after 1 minute; pH 10.5 after 2 minutes; pH 10.4 after 3 minutes). After this time, the mixture is neutralized (pH 6.8) by means of 30 ml of 0.01N hydrochloric acid. TLC in acetone shows no free dye. The solution is made up to 400 ml and subjected to ultrafiltration through a 3 kD membrane (Filtron) in an ultrafiltration cell (Berghof). The mixture is again made up with 400 ml of water, after which chloride is no longer detectable by argentometry, and the mixture is concentrated to 31% by weight.

EXAMPLE 12

200 g of a 14 percent by weight crosslinkable PVA solution as per Example 2 (with the acetal from Example 1) (pH 6.2) are stirred with 30 ml of 0.5 percent sodium carbonate solution (pH 10.94 after 1 minute). A solution of 100 mg of Remazol Schwarz B in 5 ml of water is added, and the mixture is stirred for 12 minutes. During this period, the pH drops continuously from 10.7 (after 1 minute) to 10.2 (after 12 minutes). After only 1 minute, TLC in acetone shows no free dye. After neutralization (pH 7.0) by means of 1 ml of 1N hydrochloric acid, the batch is mixed with 150 g of water and introduced into an ultrafiltration cell (Berghof) and subjected to ultrafiltration through a 3 kD membrane (Filtron), and washed with a total of 450 ml of water until the sodium chloride content in the eluate is 0.003 percent by weight (determined by argentometry). Further concentration of the solution to 37 percent by weight is carried out by removal of water by distillation at 140 mbar and 40° C. with blowing-in of air.

EXAMPLE 13

22 percent by weight aqueous solutions of dyes as shown in Table 5 are reacted at room temperature with solutions of aminoacetaldehyde dimethyl acetal (Aldrich) in 2 g of water. The reaction is monitored by TLC in acetone. No free dye is detectable.

TABLE 5

| Ex. | Dye | Initial weight of dye/g | Initial weight of water/g | Initial weight of aminoacetaldehyde dimethyl acetal/g |
|---|---|---|---|---|
| 12a) | Remazol Schwarz B | 4 | 14 | 0.951 |
| 12b) | Remazol Brillant-blau R | 4 | 14 | 0.886 |
| 12c) | Duasyn-Blau R-KG | 8 | 10 | 0.563 |
| 12d) | Remazol Gold-orange 3G | 4 | 14 | 0.858 |
| 12e) | Duasyn-Rot R-F3B | 16 | 2 | 0.808 |
| 12f) | Remazol Gelb GR | 4 | 14 | 0.772 |

EXAMPLE 14

Analogously to Example 2, 400 g of PVA (Mowiol 4–88) are stirred for 24 hours at 20° C. with 40 g of methacrylamidoacetaldehyde dimethyl acetal, 7 g of 4-aminobutyraldehyde diethyl acetal, 266.6 g of conc. hydrochloric acid (37%), 666.6 g of acetic acid and 2666.6 g of water. The pH is adjusted to 3.6 by means of aqueous NaOH, the mixture is subjected to ultrafiltration through a 5 kD membrane and then adjusted to pH 7. Concentration gives a 15.62% crosslinkable polymer solution having an amine content of 0.1 mmol/g, an acetate content of 2.383 mmol/g and an intrinsic viscosity of 0.339.

EXAMPLE 15

200 g of a 16 percent by weight PVA solution as per Example 14 are diluted with 100 g of water, and a solution of 50 mg of Remazol Gelb GR in 2.5 ml of water is slowly added with vigorous stirring. TLC in acetone shows no free dye. The solution is transferred to an ultrafiltration cell (Berghof) and, after making up to 400 ml with water, subjected to ultrafiltration through a 3 kD membrane. The mixture is made up with 200 ml of water and then concentrated to a solids content of 16 percent by weight. Argentometry shows that the salt content of the eluate is 0.003 percent by weight. Further concentration to 36 percent by weight is carried out by vacuum distillation (140 mbar, 40° C.) with blowing-in of air.

EXAMPLE 16

200 g of a 16 percent by weight PVA solution as per Example 14 are diluted with 100 g of water, and a solution of 50 mg of Remazol Goldorange 3G in 2.5 ml of water is slowly added with vigorous stirring. TLC in acetone shows no free dye. The solution is transferred to an ultrafiltration cell (Berghof) and, after making up to 400 ml with water, subjected to ultrafiltration through a 3 kD membrane. The mixture is made up with 250 ml of water and then concentrated to a solids content of 20 percent by weight. Argentometry shows that the salt content of the eluate is 0.003 percent by weight. Further concentration to 34 percent by weight is carried out by vacuum distillation (140 mbar, 40° C.) with blowing-in of air.

EXAMPLE 17

13.987 g of the crosslinkable PVA solution from Example 10 coloured by means of Duasyn-Blau R-KG are stirred with a solution of 13.9 g of Irgacure 2959 (0.3% based on the polymer) in 0.626 ml of water. The resulting 30 percent PVA solution is transferred into quartz moulds and irradiated for from 5 to 10 seconds with intense UV light (UVA PRINT 300 CM with H-lamp from Hönle, 3200 W, 12 mW/cm², measured with a Hönle-UV-B detector in the wavelength range from 280 to 320 nm) and crosslinked to give a tinted hydrogel. Extraction experiments on 20 lenses in 10 ml of water (1 hour at 121° C.) show that, according to the UV-VIS spectrum of the extraction solution, no coloured polymer is extracted from the lenses (the detection limit of the dye by means of the UV-VIS spectrum is approx. 1 ppm).

EXAMPLE 18

A mixture of 1.475 g of a coloured sol as in Example 17 and 1.474 g of a PVA sol comprising crosslinkable PVA (cf. Example 2) and 0.3 percent by weight of Irgacure 2959 is introduced into moulds and crosslinked as described in Example 17 to give a coloured hydrogel.

EXAMPLE 19

5.166 g of a PVA solution as described in Example 11 which has been coloured with Duasyn-Rot R-F3B are stirred with a solution of 4.8 mg of Irgacure 2959 (0.3% by weight based on the polymer) in 189 mg of water. After the PVA solution has been transferred into moulds and irradiated with UV light, crosslinking is carried out as described in Example 17 to give a coloured hydrogel.

EXAMPLE 20

3.973 g of a PVA solution as described in Example 12 which has been coloured with Remazol Schwarz B are stirred with a solution of 4.4 mg of Irgacure 2959 (0.3% by weight based on the polymer) in 961 mg of water. After the PVA solution has been transferred into moulds and irradiated with UV light, crosslinking is carried out as described in Example 17 to give a coloured hydrogel.

EXAMPLE 21

A mixture of 1.193 g of a coloured sol as in Example 20 and 1.165 g of a PVA sol comprising crosslinkable PVA (cf. Example 2) and 0.3 percent by weight of Irgacure 2959 is introduced into moulds and crosslinked as described in Example 17 to give a coloured hydrogel.

EXAMPLE 22

A mixture of 1.292 g of a coloured sol as in Example 19 and 1.236 g of a PVA sol comprising crosslinkable PVA (cf. Example 2) and 0.3 percent by weight of Irgacure 2959 is introduced into moulds and crosslinked as described in Example 17 to give a coloured hydrogel.

EXAMPLE 23

7.937 g of a PVA solution as described in Example 15 which has been coloured with Remazol Gelb GR are stirred with a solution of 8.6 mg of Irgacure 2959 (0.3% by weight based on the polymer) in 1.651 g of water, transferred into moulds and crosslinked as described in Example 17 to give a coloured hydrogel.

EXAMPLE 24

6.530 g of a PVA solution as described in Example 16 which has been coloured with Remazol Goldorange 3G are stirred with a solution of 6.6 mg of Irgacure 2959 (0.3% by weight based on the polymer) in 0.815 g of water, transferred into moulds and crosslinked as described in Example 17 to give a coloured hydrogel.

EXAMPLE 25

5.753 g of a PVA solution as described in Example 12 which has been coloured with Remazol Schwarz B are stirred with a solution of 10.7 mg of Irgacure 2959 (0.5% by weight based on the polymer) in 1.400 g of water, transferred into moulds and crosslinked as described in Example 17 to give a coloured hydrogel.

EXAMPLE 26

7.002 g of a PVA solution as described in Example 12 which has been coloured with Remazol Schwarz B are stirred with a solution of 26.1 mg of Irgacure 2959 (1.0% by weight based on the polymer) in 1.704 g of water, transferred into moulds and crosslinked as described in Example 17 to give a coloured hydrogel.

Table 6 below shows the water content, the transmission, the wavelength and the central thickness of the contact lenses produced in Examples 17 to 26.

TABLE 6

| Ex. | Water content a) [%] | Transmission b) [%] | Wavelength [mm] | Central thickness [μm] |
|---|---|---|---|---|
| 17 | 65 | 62 | 672 | 105 |
| 18 | 66 | 74 | 672 | 95 |
| 19 | 66 | 78 | 553 | 83 |
| 20 | 65 | 65 | 592 | 100 |
| 21 | 65 | 90 | 596 | 65 |
| 22 | 66 | 86 | 553 | 91 |
| 25 | 66 | 66 | 592 | 95 |
| 26 | 65 | 64 | 592 | 105 | a) ±2%
b) ±5%

EXAMPLE 27

(Comparative example—untinted lenses) A PVA solution as in Example 2 containing the acetal as in Example 1 was mixed with Irgacure 2959 and crosslinked analogously to Example 17. Water content 67±2%; transmission 400–800 nm >90%.

What is claimed is:

1. A process for the production of crosslinked tinted mouldings, which comprises the following steps:
    a) preparation of an essentially aqueous solution of a water-soluble crosslinkable tinted polymer comprising units containing a crosslinkable group and units containing a bonded reactive dye radical,
    b) introduction of the resultant solution into a mould,
    c) initiation of the crosslinking in water or in an organic solvent in which the crosslinkable tinted polymer is dissolved, and
    d) opening of the mould so that the moulding can be removed.

2. A process according to claim 1, wherein the mouldings are contact lenses.

3. A process according to claim 1, wherein the water-soluble crosslinkable tinted polymer of step a) is derived from a starting polymer containing, on or in the polymer chain, a functional group which can react with a reactive dye.

4. A process according to claim 3, wherein the water-soluble crosslinkable tinted polymer of step a) is derived from polyvinyl alcohol.

5. A process according to claim 3, wherein the water-soluble crosslinkable tinted polymer of step a) comprises units in the polymer chain which are derived from the following monomer units: a vinyllactam, vinyl alcohol, if desired a vinyl (lower alkane)carboxylate, a vinylic crosslinking agent and, if desired, a vinylic photoinitiator.

6. A process according to claim 5, wherein the polymer is a terpolymer of vinylpyrrolidone, vinyl acetate and vinyl alcohol.

7. A process according to claim 1, wherein the essentially aqueous solution of the water-soluble crosslinkable tinted polymer is free or essentially free from undesired constituents, such as, in particular from monomeric, oligomeric or polymeric starting compounds used for the preparation of this polymer, or from by-products formed during the preparation of this polymer, or from impurities present in the reactive dyes.

8. A process according to claim 1, wherein the essentially aqueous solution of the water-soluble crosslinkable tinted polymer is used without addition of a comonomer, in particular a vinylic comonomer.

9. A process according to claim 1, wherein an initiator for the crosslinking is added to the solution of the water-soluble, crosslinkable tinted polymer.

10. A process according to claim 1, wherein the crosslinking is not followed by extraction in order to remove undesired constituents.

11. A process according to claim 1, wherein the reactive dye is covalently bonded to the polymer backbone either directly via an ether, thioether, amino or amido group or via a bivalent or trivalent bridge.

12. A process according to claim 11, wherein the bridge is a trivalent bridge derived from an ω-amino-$C_1$–$C_{12}$alkylaldehyde acetal.

13. A process according to claim 1, which comprises the following steps:
    a) preparation of an essentially aqueous solution of a water-soluble crosslinkable tinted polymer comprising units containing a crosslinkable group and units containing a reactive dye radical covalently bonded to the polymer backbone either directly or via a bridge, which solution is free or essentially free from undesired constituents, such as, in particular, from monomeric, oligomeric or polymeric starting compounds used for the preparation of this polymer or from by-products formed during the preparation of this polymer, or from impurities present in the reactive dyes, and is used without addition of a comonomer,
    b) introduction of the resultant solution into a mould,
    c) initiation of the crosslinking, and
    d) opening of the mould so that the moulding can be removed.

14. A process according to claim 13, wherein the mouldings are tinted contact lenses.

15. A process according to claim 14 for the production of a contact lens, wherein the essentially aqueous solution is a purely aqueous solution or a solution in an artificial, preferably buffered, tear fluid.

16. A process according to claim 14 for the production of a tinted contact lens, wherein a crosslinking initiator is added to the solution, and the crosslinking takes place by photocrosslinking.

17. A tinted moulding, in particular a tinted contact lens, obtainable by a process according to claim 1.

18. A tinted contact lens according to claim 17, which is suitable for its intended use without extraction.

19. A tinted contact lens obtainable according to claim 14, which is suitable for its intended use without extraction.

20. A crosslinkable tinted polymer comprising units containing a crosslinkable group of the formula I

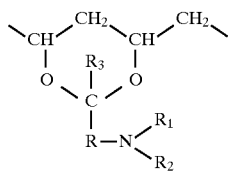 (I)

in which R is alkylene having up to 12 carbon atoms, $R_1$ is hydrogen or lower alkyl, and $R_2$ is an olefinically unsaturated, electron-withdrawing, copolymerizable radical, having up to 25 carbon atoms, and $R_3$ is hydrogen, a $C_1$–$C_6$alkyl group or a cycloalkyl group, and comprising units containing a covalently bonded reactive dye, where the covalent bond to the polymer backbone is, either direct via an ether, thioether, amino, imino or amido group or via a bivalent or trivalent bridge.

21. A crosslinkable tinted polymer according to claim 20, in which the units containing a

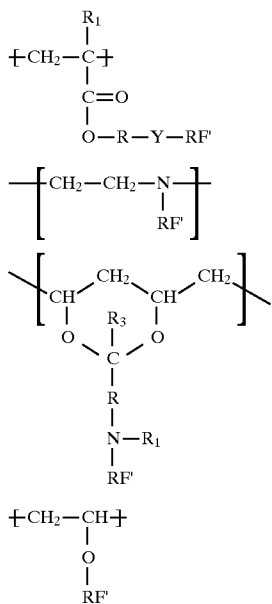

in which:

RF' is a radical of the formula

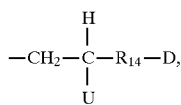

D is a radical of an organic dye, $R_{14}$ is a divalent electron-withdrawing group, U is hydrogen or halogen, R is a divalent radical of a $C_1$–$C_{12}$alkane, $R_1$ is hydrogen or $C_1$–$C_4$alkyl, $R_3$ is hydrogen, $C_1$–$C_6$alkyl or cycloalkyl, and Y is —O— or -N($R_1$)—.

22. A crosslinkable tinted polymer according to claim 21, wherein $R_1$ and $R_3$ are hydrogen, R is $C_1$–$C_4$alkylene, and RF' and Y are as defined above.

23. A crosslinkable tinted polymer according to claim 20, wherein the covalently bonded reactive dye is derived from a reactive dye which conforms to the general formula XVII or XIII

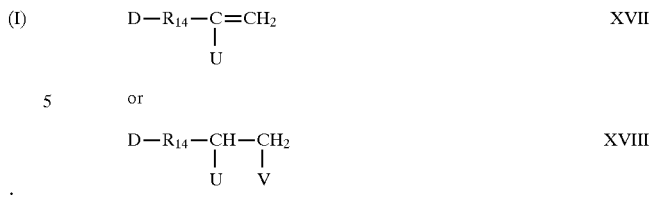

in which D is a radical of an organic dye, $R_{14}$ is a divalent, organic, electron-withdrawing group, U is hydrogen or halogen, and V is a leaving group, or mixtures thereof.

24. A crosslinkable tinted polymer according to claim 23, wherein D is the radical of an azo (monoazo or disazo), phthalocyanine, azomethine, nitro, metal complex or anthraquinone dye.

25. A crosslinkable tinted polymer according to claim 23, wherein $R_{14}$ is —CO—, —$SO_2$—, —SO—, —NHCO— or —$NHSO_2$—.

26. A crosslinkable tinted polymer according to claim 21, wherein the reactive dye radical RF' is derived from Remazol Schwarz B (Reactive Black 5), Remazol Brillantblau R (Reactive Blue 19, Duasyn-Blau R-R), Remazol Türkisblau G (Reactive Blue 21, Duasyn-Blau R-KG), Remazol Goldorange 3G (Reactive Orange 78), Remazol Brillantrot F3B (Reactive Red 180, Duasyn-Rot R-F3B), Remazol Gelb GR (Reactive Yellow 15), Remazol Brillantgelb GL (Reactive Yellow 37, Duasyn-Gelb R-GL), Duasyn-Gelb R-R (mixture of Reactive Yellow 17 and Reactive Yellow 15), Remazol Brillantgrun 6B (Reactive Blue 38, Duasyn-Grun R-K6B), Remazol Schwarz RL (Reactive Black 31, Duasyn-Schwarz R-KRL), Duasyn-Schwarz R-N (mixture of Reactive Black 5 and Reactive Orange 72), Remazol Brillantorange 3R (Reactive Orange 16), Remazol Brillantblau B, Remazol Brillantblau BB, Remazol Druckschwarz G, Remazol Rot B, or Duasyn-Blau R-UG.

27. A crosslinkable tinted polymer according to claim 20, which is a derivative of a polyvinyl alcohol having a mean molecular weight of at least about 2000 which comprises from about 0.5 to about 80%, based on the number of hydroxyl groups in the polyvinyl alcohol, of crosslinkable units of the formula I

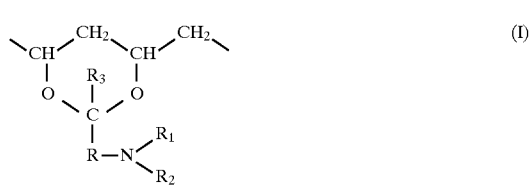 (I)

in which R is alkylene having up to 12 carbon atoms, $R_1$ is hydrogen or lower alkyl, and $R_2$ is an olefinically unsaturated, electron-withdrawing, copolymerizable radical, having up to 25 carbon atoms, and $R_3$ is hydrogen, a $C_1$–$C_6$alkyl group or a cycloalkyl group.

28. A crosslinkable tinted polymer according to claim 27, in which $R_2$ is an olefinically unsaturated acyl radical of the formula $R_{30}$—CO—, in which $R_{30}$ is an olefinically unsaturated, copolymerizable radical having 2 to 24 carbon atoms.

29. A crosslinkable tinted polymer according to claim 28, in which $R_{30}$ is alkenyl having 2 to 8 carbon atoms.

30. A crosslinkable tinted polymer according to claim 27, in which the radical $R_2$ is a radical of the formula II

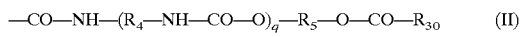

in which q is zero or one, and $R_4$ and $R_5$, independently of one another, are lower alkylene having 2 to 8 carbon atoms, arylene having 6 to 12 carbon atoms, a saturated bivalent cycloaliphatic group having 6 to 10 carbon atoms, arylenealkylene or alkylenearylene having 7 to 14 carbon atoms or arylenealkylenearylene having 13 to 16 carbon atoms, and in which $R_{30}$ is an olefinically unsaturated, copolymerizable radical having 2 to 24 carbon atoms.

31. A crosslinkable tinted polymer according to claim 27, which is a derivative of a polyvinyl alcohol having a molecular weight of at least about 2000 which comprises from about 0.5 to about 80%, based on the number of hydroxyl groups in the polyvinyl alcohol, of units of the formula III

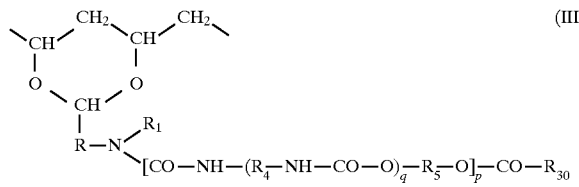

in which R is lower alkylene, $R_1$ is hydrogen or lower alkyl, p has the value zero or one, q has the value zero or one, $R_{30}$ is an olefinically unsaturated, copolymerizable radical having 2 to 8 carbon atoms, and $R_4$ and $R_5$, independently of one another, are lower alkylene having 2 to 8 carbon atoms, arylene having 6 to 12 carbon atoms, a saturated bivalent cycloaliphatic group having 6 to 10 carbon atoms, arylenealkylene or alkylenearylene having 7 to 14 carbon atoms or arylenealkylenearylene having 13 to 16 carbon atoms.

32. A crosslinkable tinted polymer according to claim 31, in which R is lower alkylene having up to 6 carbon atoms, p is zero and $R_{30}$ is alkenyl having 2 to 8 carbon atoms.

33. A crosslinkable tinted polymer according to claim 31, in which R is lower alkylene having up to 6 carbon atoms, p is one, q is zero, $R_5$ is lower alkylene having 2 to 6 carbon atoms, and $R_{30}$ is alkenyl having 2 to 8 carbon atoms.

34. A crosslinkable tinted polymer according to claim 31, in which R is lower alkylene having up to 6 carbon atoms, p is one, q is one, $R_4$ is lower alkylene having 2 to 6 carbon atoms, phenylene, unsubstituted or substituted by lower alkyl, cyclohexylene or cyclohexylene(lower alkylene), unsubstituted or substituted by lower alkyl, phenylene(lower alkylene), (lower alkylene)phenylene or phenylene(lower alkylene)phenylene, $R_5$ is lower alkylene having 2 to 6 carbon atoms, and $R_{30}$ is alkenyl having 2 to 8 carbon atoms.

35. A crosslinkable tinted polymer according to claim 27, which is a derivative of a polyvinyl alcohol having a molecular weight of at least about 2000 which comprises from about 1 to about 15%, based on the number of hydroxyl groups in the polyvinyl alcohol, of units of the formula I.

36. A compound of the formula XI

in which the symbols R' and R" are hydrogen or lower alkyl or lower alkanoyl, and the other symbols $R_3$, R, $R_1$ and RF' are as defined in claim 21.

37. A crosslinked tinted polymer obtainable by photocrosslinking a crosslinkable tinted polymer according to claim 20 in the presence or absence of an additional vinylic comonomer.

38. A crosslinked tinted polymer according to claim 37, wherein said crosslinked tinted polymer is photocrosslinked in essentially pure form additional vinylic comonomerl.

39. A crosslinked tinted polymer according to claim 38, where the crosslinkable tinted polymer is converted into essentially pure form by single or repeated ultrafiltration.

40. A crosslinked tinted polymer according to claim 37, wherein said crosslinked tinted polymer is photocrosslinked in the absence of an additional vinylic comonomer.

41. A crosslinked tinted polymer according to claim 37, wherein said crosslinked tinted polymer is photocrosslinked in the presence of from 0.5 to 80 units of an additional vinylic comonomer per unit of the formula I.

42. A process for the preparation of a crosslinked tinted polymer according to claim 37, which comprises photocrosslinking said crosslinkable tinted polymer ccording to claim 20 in the presence or absence of an additional vinylic comonomer.

43. A process according to claim 42, wherein the crosslinkable tinted polymer is employed in essentially pure form.

44. A process according to claim 43, wherein the crosslinkable tinted polymer is converted into essentially pure form by single or repeated ultrafiltration.

45. A process according to claim 42, which is carried out in a solution.

46. A tinted moulding essentially comprising a crosslinked tinted polymer according to claim 37.

47. A tinted moulding according to claim 46, which is a tinted contact lens.

48. A process for the production of a tinted moulding according to claim 46, which comprises photocrosslinking said crosslinkable tinted polymer in a closed mould in the presence or absence of an additional vinylic comonomer.

49. A process for the production of a tinted contact lens according to claim 47, which comprises photocrosslinking said crosslinkable tinted polymer in a closed contact-lens mould by the full-mould process in the presence or absence of an additional vinylic comonomer.

* * * * *